US010974680B2

(12) United States Patent
Ohmi et al.

(10) Patent No.: US 10,974,680 B2
(45) Date of Patent: Apr. 13, 2021

(54) VEHICLE OCCUPANT PROTECTING DEVICE

(71) Applicant: TOYOTA JIDOSHA KABUSHIKI KAISHA, Toyota (JP)

(72) Inventors: Masanobu Ohmi, Kasugai (JP); Seiji Yamamoto, Seto (JP); Kosuke Sakakibara, Toyota (JP); Kazuki Sugie, Miyoshi (JP); Misato Kinoshita, Toyota (JP); Yoshiaki Matsumura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 16/087,816

(22) PCT Filed: Mar. 31, 2017

(86) PCT No.: PCT/JP2017/013844
§ 371 (c)(1),
(2) Date: Sep. 24, 2018

(87) PCT Pub. No.: WO2017/171086
PCT Pub. Date: Oct. 5, 2017

(65) Prior Publication Data
US 2019/0111879 A1 Apr. 18, 2019

(30) Foreign Application Priority Data
Mar. 31, 2016 (JP) .............................. JP2016-072603

(51) Int. Cl.
*B60R 21/207* (2006.01)
*B60R 21/233* (2006.01)
(Continued)

(52) U.S. Cl.
CPC ........ *B60R 21/207* (2013.01); *B60R 13/0212* (2013.01); *B60R 21/231* (2013.01);
(Continued)

(58) Field of Classification Search
CPC .................... B60R 13/0225; B60R 2021/2074
See application file for complete search history.

(56) References Cited

U.S. PATENT DOCUMENTS

| 9,428,138 B2 * | 8/2016 | Farooq ................ B60R 21/2338 |
| 2002/0014760 A1 * | 2/2002 | Bossecker ............. B60R 21/207 |
| | | 280/730.1 |

(Continued)

FOREIGN PATENT DOCUMENTS

| DE | 19834061 A1 | 2/2000 | |
| DE | 19834061 A1 * | 2/2000 | ............. B60N 2/806 |

(Continued)

*Primary Examiner* — Nicole T Verley
(74) *Attorney, Agent, or Firm* — Oliff PLC

(57) ABSTRACT

A vehicle occupant protecting device, includes: an multidirectional airbag that is accommodated in a headrest, and that receives a gas supply from an inflator and inflates and expands, and that protects a head portion of a vehicle occupant from at least a front side and left and right both sides, and at which a front expanding portion, which protects the head portion from a front side, passes above the head portion in a process of inflating and expanding; and a vehicle cabin ceiling at which a reinforcing portion as an expanding (Continued)

direction regulating means is provided at an interference region which the front expanding portion interferes with in the process of inflating and expanding, and that, by the interference, directs an expanding direction of the front expanding portion toward a front side of the head portion.

6 Claims, 16 Drawing Sheets

(51) Int. Cl.
*B60R 21/2334* (2011.01)
*B60R 21/231* (2011.01)
*B60R 13/02* (2006.01)
*B60R 21/2165* (2011.01)
*B60R 21/237* (2006.01)
*B60R 21/261* (2011.01)
*B60R 21/00* (2006.01)

(52) U.S. Cl.
CPC ........ *B60R 21/233* (2013.01); *B60R 21/2334* (2013.01); *B60R 21/2165* (2013.01); *B60R 21/237* (2013.01); *B60R 21/261* (2013.01); *B60R 2013/0287* (2013.01); *B60R 2021/0048* (2013.01); *B60R 2021/2074* (2013.01); *B60R 2021/23107* (2013.01); *B60R 2021/23308* (2013.01); *B60R 2021/2615* (2013.01)

(56) References Cited

U.S. PATENT DOCUMENTS

| | | | |
|---|---|---|---|
| 2010/0283230 A1 | 11/2010 | Tomitaka et al. | |
| 2014/0015233 A1* | 1/2014 | Fukawatase | B60R 21/08 280/730.1 |
| 2014/0327234 A1* | 11/2014 | Heurlin | B60N 2/2872 280/730.1 |
| 2017/0203711 A1* | 7/2017 | Ohno | B60R 21/237 |

FOREIGN PATENT DOCUMENTS

| | | | | |
|---|---|---|---|---|
| DE | 19930058 A1 * | 1/2001 | | B60R 21/16 |
| DE | 10039810 A1 | 2/2002 | | |
| DE | 10039807 A1 * | 5/2002 | | B60R 21/207 |
| DE | 19834061 B4 | 12/2005 | | |
| DE | 202015005104 U1 * | 9/2015 | | B60R 21/207 |
| EP | 1632407 A2 * | 3/2006 | | B60R 21/214 |
| JP | 2005-067272 A | 3/2005 | | |
| JP | 2006-062389 A | 3/2006 | | |
| JP | 2006-281952 A | 10/2006 | | |
| JP | 2007-230395 A | 9/2007 | | |
| JP | 2013-018378 A | 1/2013 | | |
| JP | 2015-151105 A | 8/2015 | | |
| JP | 2016-215861 A | 12/2016 | | |
| JP | 2018083554 A * | 5/2018 | | |
| WO | 2009/035116 A1 | 3/2009 | | |
| WO | 2014/013851 A1 | 1/2014 | | |
| WO | 2015/125872 A1 | 8/2015 | | |
| WO | 2015/145285 A1 | 10/2015 | | |

* cited by examiner

VEHICLE OCCUPANT PROTECTING DEVICE

TECHNICAL FIELD

The present invention relates to a vehicle occupant protecting device.

BACKGROUND ART

The airbag device disclosed in Japanese Patent Application Laid-Open (JP-A) No. 2013-018378 has a pair of airbags for the head portion that inflate and expand toward the front from the left and right end portions of the headrest of a seat and that are joined together in front of the head portion of a vehicle occupant, and an auxiliary airbag for the head portion that inflates and expands toward the front from the central portion of the headrest of the seat and that is joined to the airbags for the head portion. Due thereto, the head portion is surrounded and protected from the front side, the left and right both sides, and the upper side.

SUMMARY OF INVENTION

Technical Problem

In the airbag device of the above-described structure, the airbags for the head portion include regions (hereinafter called "front expanding portions") that protect the head portion of the vehicle occupant from the front. At the time when these airbags for the head portion are inflated and expanded from the headrest, the expanding directions must be set such that the airbags do not inadvertently interfere with the head portion of the vehicle occupant in the process of inflating and expanding. As a result, there is the possibility that the expanding of the front expanding portions toward the front of the head portion will be delayed.

In consideration of the above-described circumstances, an object of the present invention is to provide a vehicle occupant protecting device that, in a structure in which airbag that inflates and expands from a headrest or a seatback includes a front expanding portion that protects the head portion of a vehicle occupant from the front side, can hasten the expanding of the front expanding portion toward the front of the head portion.

Solution to Problem

A vehicle occupant protecting device of a first aspect comprises: an airbag that is accommodated in a headrest or a seatback, that receives a gas supply from an inflator and inflates and expands, that protects a head portion of a vehicle occupant from at least a front side and left and right both sides, and at which a front expanding portion, which protects the head portion from a front side, passes above the head portion in a process of inflating and expanding; and a vehicle cabin ceiling at which an expanding direction regulating means is provided at an interference region which the airbag interferes with in the process of inflating and expanding, and that, by the interference, directs an expanding direction of the front expanding portion toward a front side of the head portion.

In the first aspect, the airbag that is accommodated in the headrest or the seatback receives a gas supply from the inflator and inflates and expands, and protects the head portion of the vehicle occupant at least from the front side and the left and right both sides. At this airbag, the front expanding portion that protects the head portion from the front side passes above the head portion in the process of inflating and expanding. Further, the airbag interferes with the vehicle cabin ceiling in the process of inflating and expanding. The expanding direction regulating means is provided at the vehicle cabin ceiling, at the interference region that the airbag interferes with, and the expanding direction of the front expanding portion is directed toward the front side of the head portion by the aforementioned interfering. Due thereto, the front expanding portion can be made to expand toward the front of the head portion at an early stage.

In a vehicle occupant protecting device of a second aspect, in the first aspect, the expanding direction regulating means has a reinforcing portion that is disposed within the vehicle cabin ceiling, and that reinforces the interference region with respect to a load from a lower side.

In the second aspect, the interference region of the airbag at the vehicle cabin ceiling is reinforced with respect to the load from the lower side by the reinforcing portion that is disposed within the vehicle cabin ceiling. Therefore, at the time when the airbag, which is in the process of inflating and expanding, interferes with the interference region from the lower side, deformation of the interference region is suppressed. As a result, the reaction force toward the lower side that the airbag receives from the interference region is high, and it is easy for the airbag to ricochet back toward the lower side. Due thereto, the expanding direction of the front expanding portion is directed toward the front side of the head portion. Because there is a structure in which the vehicle cabin ceiling is partially reinforced by the reinforcing portion that is disposed within the vehicle cabin ceiling in this way, it can be made such that the design of the vehicle cabin ceiling is not affected.

In a vehicle occupant protecting device of a third aspect, in the first aspect, the expanding direction regulating means has an inclined surface that is inclined downward while heading in a vehicle forward direction or a vehicle rearward direction, and the airbag that is in the process of inflating and expanding interferes with the inclined surface.

In the third aspect, the inclined surface, which is inclined downward while heading in the vehicle forward direction or the vehicle rearward direction, is provided at the vehicle cabin ceiling, and the airbag that is in the process of inflating and expanding interferes with this inclined surface. Due thereto, the expanding direction of the front expanding portion can be effectively directed toward the front side of the head portion.

In a vehicle occupant protecting device of a fourth aspect, in the third aspect, at the vehicle cabin ceiling, an installation portion in which an air conditioner or a sunroof device is installed, bulges out toward a lower side, and an end surface at a vehicle rear side of the installation portion is the inclined surface.

Because the fourth aspect is structured as described above, in a vehicle in which an air conditioner or a sunroof device is installed in the vehicle cabin ceiling, the inclined surface can be provided at the vehicle cabin ceiling by utilizing an existing structure.

In a vehicle occupant protecting device of a fifth aspect, in the first aspect, the expanding direction regulating means has an interfering member for interfering with the airbag that is in the process of inflating and expanding, and a drive source that is operated at a time when the inflator is operated, and that moves the interfering member from an interior of the vehicle cabin ceiling toward an interior of a vehicle cabin.

In the fifth aspect, at the time when the inflator is operated, the drive source is operated, and the interfering member is moved from the interior of the vehicle cabin ceiling toward the interior of the vehicle cabin by the drive source. Due thereto, the airbag that is in the process of inflating and expanding interferes with the interfering member, and the expanding direction of the front expanding portion is directed toward the front side of the head portion. Because the expanding direction regulating means has the drive source in this way, the interfering member can be accommodated within the vehicle cabin ceiling at usual times.

In a vehicle occupant protecting device of a sixth aspect, in the first aspect, the vehicle cabin ceiling has a roof head lining that is an interior material, and the expanding direction regulating means is a plurality of reinforcing portions that are provided at an upper surface of the roof head lining so as to be lined up at least in a vehicle longitudinal direction among the vehicle longitudinal direction and a vehicle transverse direction, and that reinforce the roof head lining.

In the sixth aspect, the airbag that is in the process of inflating and expanding interferes with the roof head lining that is the interior material of the vehicle cabin ceiling. This roof head lining is reinforced by the plural reinforcing portions that are provided at the upper surface. The plural reinforcing portions are lined up at least in the vehicle longitudinal direction, among the vehicle longitudinal direction and the vehicle transverse direction. Therefore, at the time when the airbag interferes with the roof head lining, the roof head lining deforms at the non-reinforcing portions (the weak portions) that are between the plural reinforcing portions. Due thereto, the interfering portion, which interferes with the airbag, at the roof head lining is indented toward the vehicle upper side, and a recess is formed. The expanding direction of the front expanding portion can effectively be directed toward the front side of the head portion by this recess.

Advantageous Effects of Invention

As described above, in the vehicle occupant protecting device relating to the present invention, in a structure in which airbag that inflates and expands from a headrest or a seatback includes a front expanding portion that protects the head portion of a vehicle occupant from the front side, the expanding of the front expanding portion toward the front of the head portion can be hastened.

DESCRIPTION OF EMBODIMENTS

First Embodiment

Figure 1:
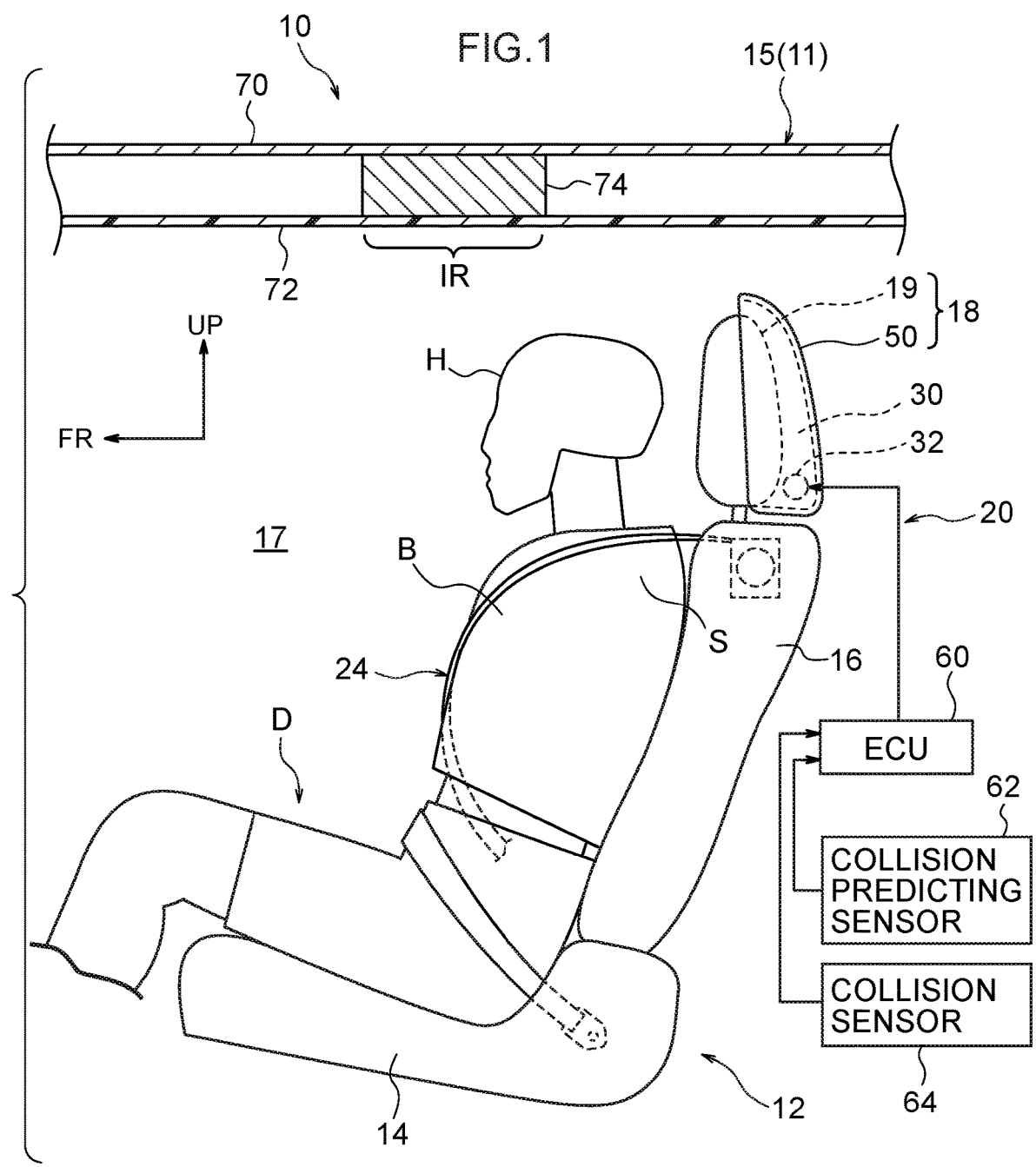
FIG. 1 is a cross-sectional view in which a partial structure of an automobile, to which a vehicle occupant protecting device relating to a first embodiment of the present invention is applied, is seen from the vehicle left side.
Figure 2:
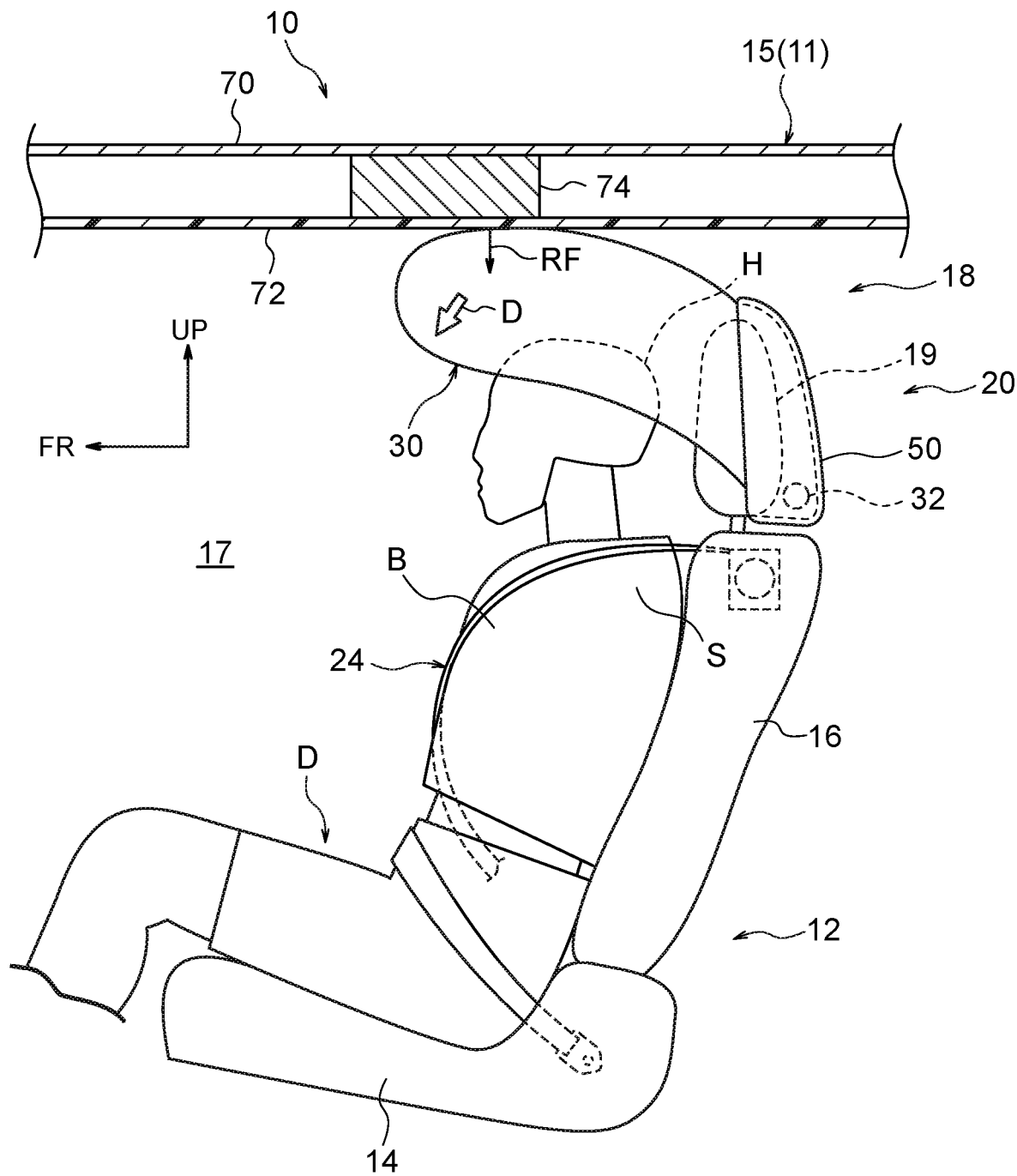
FIG. 2 is a cross-sectional view that corresponds to FIG. 1 and shows a state in the inflation and expansion process of an airbag in the vehicle occupant protecting device relating to the first embodiment.
Figure 3:
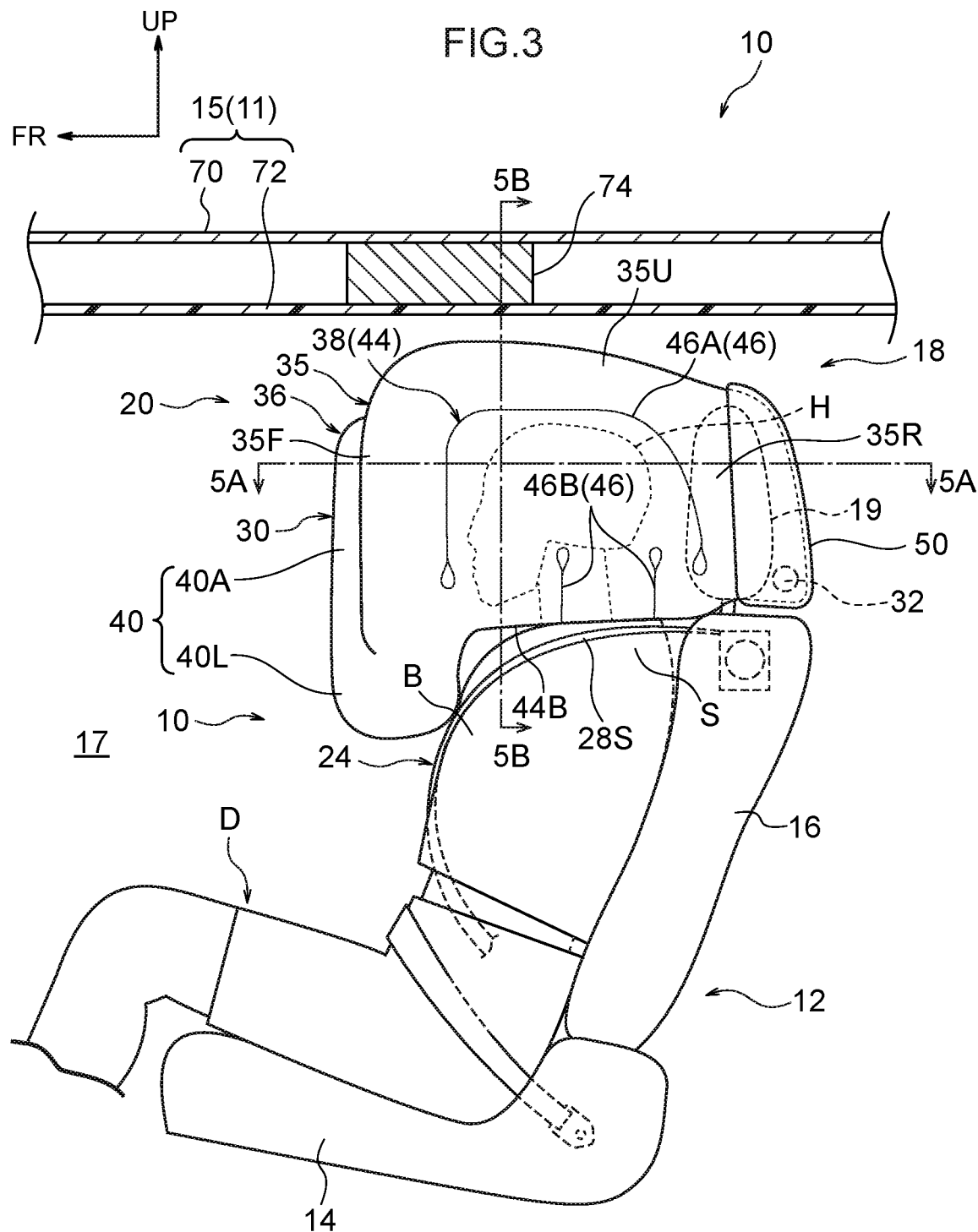
FIG. 3 is a cross-sectional view that corresponds to FIG. 1 and shows a state of completion of inflation and expansion of the airbag in the vehicle occupant protecting device relating to the first embodiment.
Figure 4:
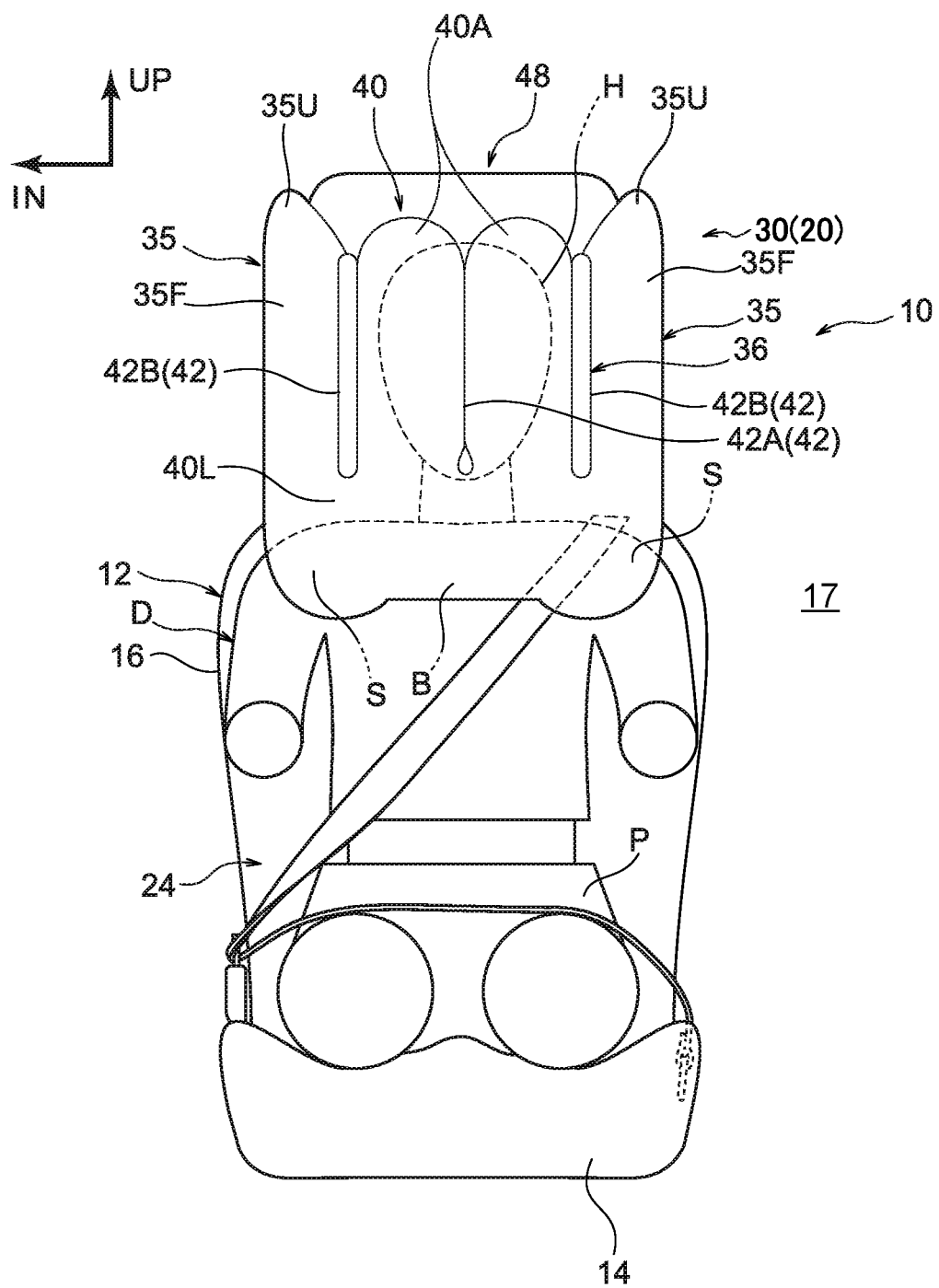
FIG. 4 is a front view in which a portion of FIG. 3 is seen from the vehicle front side.
Figure 5A:
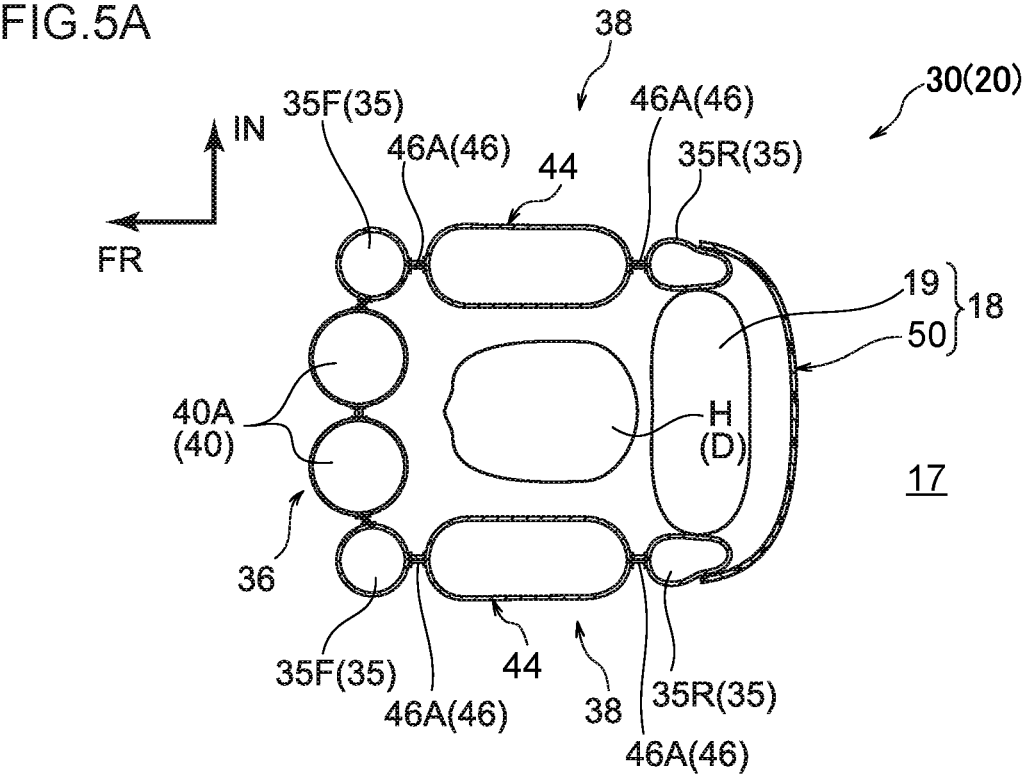
FIG. 5A is a cross-sectional view showing the cross-section cut along line 5A-5A of FIG. 3.
Figure 5B:
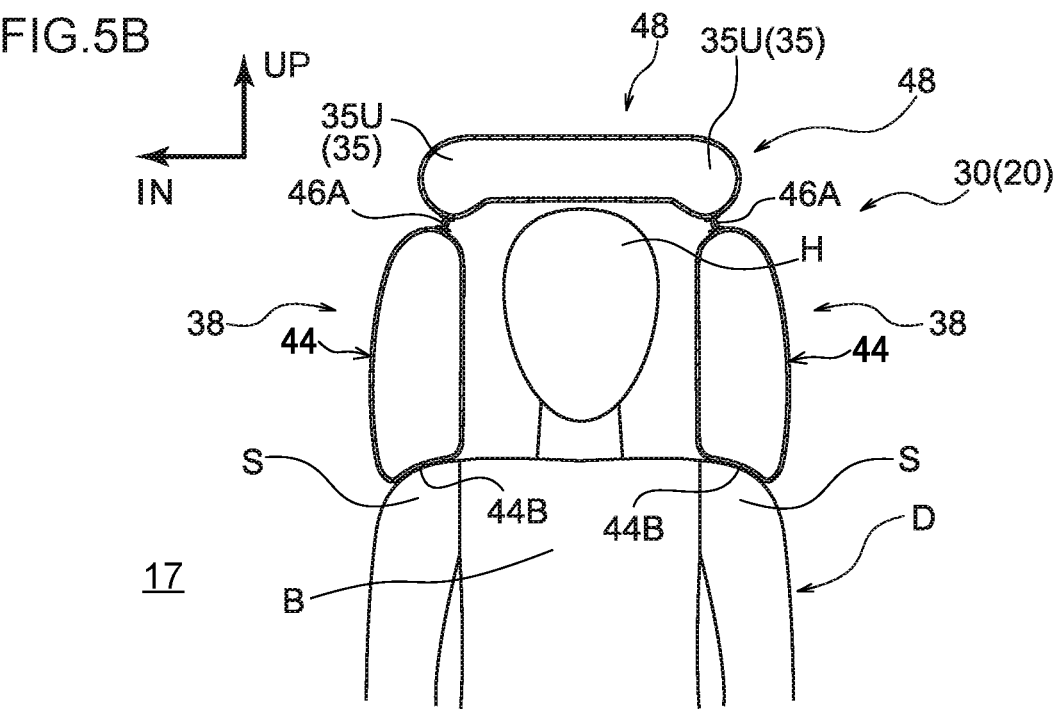
FIG. 5B is a cross-sectional view showing the cross-section cut along line 5B-5B of FIG. 3.

A vehicle occupant protecting device 10 relating to a first embodiment of the present invention is described on the basis of FIG. 1 through FIG. 5B. Note that arrow FR and arrow UP that are shown appropriately in the respective drawings indicate the forward direction and the upward direction of a vehicle seat 12, respectively. Hereinafter, when description is given by merely using longitudinal, vertical and left-right directions, they refer to the longitudinal of the seat longitudinal direction, the vertical of the seat vertical direction and the left and right when facing forward in the seat longitudinal direction, unless otherwise indicated. Further, in the present embodiment, at the vehicle seat 12, the seat longitudinal direction coincides with the longitudinal direction of the vehicle, the seat vertical direction coincides with the vertical direction of the vehicle, and the seat transverse direction coincides with the vehicle transverse direction. Further, arrow IN that is shown appropriately in the respective drawings indicates the central side in the vehicle transverse direction at an automobile 11 that serves as a vehicle and in which the vehicle seat 12 is installed. Further, there are cases in which reference numerals are omitted as appropriate in the respective drawings in order to make the drawings easy to understand.

As shown in FIG. 1, the vehicle occupant protecting device 10 is structured by a multidirectional airbag device 20 that is installed in the vehicle seat 12, and a roof 15 that serves as a vehicle cabin ceiling. The vehicle seat 12 is, for example, the driver's seat of the automobile 11, and is disposed at the left side or the right side (here, the left side) within a vehicle cabin 17 of the automobile 11. This vehicle seat 12 is structured to include a seat cushion 14, a seatback 16 whose lower end portion is connected to the rear end portion of the seat cushion 14, and a headrest 18 that is connected to the upper end portion of the seatback 16. The seat cushion 14 is connected, so as to be slidable in the vehicle longitudinal direction, to the floor portion of the vehicle cabin 17 via a known sliding mechanism (neither of which is illustrated).

Note that FIG. 1 through FIG. 5B illustrate a state in which a crash test dummy (mannequin) D is seated in the vehicle seat 12 as a model of a vehicle occupant who is to be protected. Further, FIG. 1 through FIG. 4 illustrate a state in which the dummy D that is seated in the vehicle seat 12 is restrained by a 3-point seatbelt device 24 (not shown in FIG. 5B). The dummy D is, for example, an AM50 (50th percentile U.S. adult male) World SID (internationally standardized side crash dummy: World Side Impact Dummy). This dummy D is seated in a standard seated posture (a regular state) that is prescribed by the crash test method, and the vehicle seat 12 is positioned at a reference set position that corresponds to this seated posture. Note that a head portion H of the dummy D is the region that is upward of the neck and includes the face, and the face faces toward the vehicle front (the seat front). Hereinafter, the dummy D is called the "vehicle occupant D" in order to make explanation easy to understand.

(Structure of Multidirectional Airbag Device)

The multidirectional airbag device 20 is a device for protecting the vehicle occupant D from collisions of various forms, and, as shown in FIG. 1 through FIG. 5l, has a multidirectional airbag 30 that serves as an airbag, and an inflator 32. The multidirectional airbag 30 and the inflator 32 are made into a module, and are accommodated within an airbag case 50 that is provided at the rear portion of the headrest 18. This airbag case 50 is mounted to the seat rear side of a headrest main body 19 that structures the main body portion of the headrest 18.

The multidirectional airbag 30 is structured as an integral bag body that is inflated an expanded so as to cover (surround) the head portion H of the vehicle occupant D from the front side, the left and right both sides, and above. Concretely, the multidirectional airbag 30 is structured to include a pair of left and right frame ducts 35 that inflate and expand with an interval therebetween at regions that include the left and right both sides and the upper side with respect to the head portion H, a front expanding portion 36 that protects the head portion H from the front, a pair of lateral expanding portions 38 that protect the head portion H from the left and right both sides, and an upper expanding portion 48 that protects the head portion H from the upper side.

The frame ducts 35 are formed as a pair and are provided respectively at the seat transverse direction both sides with respect to the head portion H, and are respectively structured so as to be inflated and expanded in substantial U-shapes that open downward as seen in a side view. Concretely, as seen in a side view of the inflated and expanded state, the frame duct 35 includes a rear duct 35R that extends vertically along the headrest 18, an upper duct 35U that extends forward from the upper end of the rear duct 35R, and a front duct 35F that hangs-down from the front end of the upper duct 35U. This frame duct 35 has the function of guiding gas from the inflator 32 to the front expanding portion 36, the lateral expanding portions 38 and the upper expanding portion 48.

The front expanding portion 36 is structured to include a front inflating portion 40 that includes a portion that is expanded in front of the head portion H, and non-inflating portions 42 that partition the front inflating portion 40 into plural inflating portions. In this embodiment, the front inflating portion 40 is structured to include a pair of vertical inflating portions 40A, whose length directions are the vertical direction respectively and that are inflated and expanded adjacent to one another in the seat transverse direction, and a lower inflating portion 40L that is positioned beneath the pair of vertical inflating portions 40A. The interior of the lower inflating portion 40L communicates with the interiors of the front ducts 35F of the frame ducts 35, and the interiors of the pair of vertical inflating portions 40A communicate with the interior of the lower inflating portion 40L. The pair of vertical inflating portions 40A are structured so as to be inflated and expanded in front of (at the front side of) the head portion H, and the lower inflating portion 40L is structured so as to be inflated and expanded in front of a chest region B and shoulder portions S of the vehicle occupant D.

The non-inflating portions 42 are structured to include a non-inflating portion 42A, which partitions the pair of vertical inflating portions 40A in the seat transverse direction, and non-inflating portions 42B that are interposed between the respective vertical inflating portions 40A and the front ducts 35F of the frame ducts 35. In this embodiment, the non-inflating portion 42A is structured by a seam that is linear and extends vertically, and the non-inflating portions 42B are structured as portions that are surrounded by annular (endless) seams that extend vertically.

The lateral expanding portion 38 is structured to include a lateral inflating portion 44 that is inflated and expanded at the side of the head portion H, and non-inflating portions 46 that partition the lateral inflating portion 44 into plural inflating portions. The interior of the lateral inflating portion 44 communicates with the interior of the front duct 35F of the frame duct 35. In this embodiment, the lateral expanding portion 38 that is in an inflated and expanded state is surrounded by the frame duct 35 from three directions that are the rear side, the upper side and the front side, and, as seen in a side view, is formed in a substantially rectangular shape. Further, the lateral expanding portion 38 has a size (surface area) that overlaps substantially the entire head portion H. The lateral inflating portion 44 of this lateral expanding portion 38 is partitioned-off from the frame duct 35 by a U-shaped seam 46A, which forms an upside-down U-shape that opens downward, at the seams that structure the non-inflating portions 46. Further, the non-inflating portions 46 are structured to include a pair of front and rear vertical seams 46B that extend from the lower edge of the lateral inflating portion 44 to the inside of the opening of the U-shaped seam 46A.

In the state in which the multidirectional airbag 30 is inflated and expanded, lower ends 44B of the respective lateral inflating portions 44 of the left and right lateral expanding portions 38 contact the tops of the shoulder portions S of the vehicle occupant D. This is a structure in which, due to the lower ends 44B of the lateral inflating portions 44 contacting the shoulder portions S, the position in the vertical direction of the multidirectional airbag 30 in the inflated and expanded shape with respect to (the head portion H of) the vehicle occupant D is determined. The multidirectional airbag 30 in this positioned state is structured such that, with respect to the vehicle occupant D who is in a usual seated posture, none of the front expanding portion 36, the left and right lateral expanding portions 38, and the upper expanding portion 48 that is described later contact the head portion H (gaps are formed).

The upper expanding portion 48 is an expanding portion that is inflated and expanded above the head portion H with the seat transverse direction being the length direction. Further, a seam that is an unillustrated non-inflating portion is provided at the upper expanding portion 48. The thickness in the seat vertical direction of the upper expanding portion 48 is limited by this seam. The interior of the upper expanding portion 48 communicates with the interiors of the upper ducts 35U of the frame ducts 35.

The multidirectional airbag 30 that is structured as described above is formed as an integral bag body by OPW (the abbreviation for One Piece Woven). At usual times, the multidirectional airbag 30 is accommodated within the bag case 50 in folded-up state (see FIG. 1). Note that the multidirectional airbag 30 may be formed as an integral bag body by, for example, a method (Cut & Sew) of sewing together the peripheral edges of two woven fabrics.

As shown in FIG. 1, the inflator 32 is provided at the interior of the airbag case 50 together with the multidirectional airbag 30. Here, the inflator 32 is a cylinder-type inflator, and is disposed with the seat transverse direction being the length direction thereof. The inflator 32 is a combustion-type or a cold-gas type inflator, and is connected to the lower ends of the previously-described rear ducts 35R. Due thereto, there is a structure in which gas generated from the inflator 32 is supplied into the multidirectional airbag 30.

Operation of the inflator 32 is controlled by an ECU 60 (omitted from illustration except in FIG. 1) that is a control device. The ECU 60 is electrically connecting to the inflator 32 of the multidirectional airbag device 20. Further, a collision predicting sensor 62, such as a pre-crash sensor or the like, and a collision sensor 64 (illustration of both omitted except in FIG. 1) are electrically connected to the ECU 60.

On the basis of signals from the collision predicting sensor 62, the ECU 60 can predict that collisions of various forms with respect to the automobile are inevitable. The collision predicting sensor 62 is structured to include, for example, an unillustrated stereo camera that is provided in a vicinity of the vehicle transverse direction center of the upper portion of the windshield glass. Further, the forward side of the vehicle is imaged by this stereo camera, and a collision body that is to collide with the vehicle is detected. Further, the distance to the collision body detected by the stereo camera, the relative speed between the vehicle and the collision body, and the like are measured, and the measurement data is outputted to the ECU 60. Then, on the basis of the measurement data from the stereo camera, the ECU 60 judges whether or not a collision of the vehicle is inevitable. Note that the collision predicting sensor 62 may be structured by a millimeter wave radar or the like.

Further, when, on the basis of signals from the collision sensor 64, the ECU 60 senses a collision of the vehicle, the ECU 60 operates the inflator 32. Due thereto, gas generated from the inflator 32 is supplied into the multidirectional airbag 30. Note that, as an example, the collision sensor 64 is structured to include acceleration sensors (front satellite sensor) that are disposed at front side members, an acceleration sensor (a floor sensor) that is disposed at the floor beneath the center console, pressure sensors or acceleration sensors (in-door sensors) that are disposed within the front side doors and the rear side doors, and acceleration sensors (in-pillar sensors) that are disposed within the B-pillars and within the C-pillars.

(Structure of Roof)

The roof 15 structures the ceiling of the vehicle cabin 17, and has a roof panel 70 that is an outer panel, a roof head lining 72 that is an interior material (an inner panel), and a reinforcing portion 74 that is an expanding direction regulating means (expanding direction controlling means). The roof panel 70 is a member that is also called a roof body panel, a roof main body, or the like, and is formed by a steel plate for example. The roof panel 70 extends in the vehicle longitudinal direction and the vehicle transverse direction in a posture in which the plate thickness direction thereof runs along the vehicle vertical direction, and forms a design surface of the vehicle body. The vehicle transverse direction both end portions of the roof panel 70 are joined to unillustrated roof side rails.

The roof head lining 72 is a member that is also called a ceiling interior material, an interior ceiling, a molded ceiling, an interior trim, or the like, and is formed in the shape of a plate and of resin for example. The roof head lining 72 is disposed substantially parallel to the roof panel 70 at the lower side thereof and so as to be separated therefrom, and unillustrated places thereof are fixed to the roof panel 70 and the roof side rails by using clips or the like.

The reinforcing portion 74 has a rectangular parallelepiped outer shape for example, and is disposed between the roof panel 70 and the roof head lining 72, i.e., within the roof 15. The reinforcing portion 74 is fixed to at least one of the roof panel 70 and the roof head lining 72, and faces the other so as to abut or be close to the other. Various materials such as, for example, metal, resin, fiber-reinforced resin, a reinforced resin that is reinforced by talc, or the like can be used as the material of the reinforcing portion 74. Further, the shape of the reinforcing portion 74 is not limited to a block shape, and can be changed appropriately. Further, the reinforcing portion 74 may be a structure that is divided into plural divisional bodies. However, it is preferable that the reinforcing portion 74 be light-weight and have high strength and rigidity with respect to load in the vehicle vertical direction.

Note that, in a case in which the reinforcing portion 74 is formed of a material having a high specific gravity such as a metal or the like, it is preferable that the reinforcing portion 74 be fixed to the roof panel 70. Further, the reinforcing portion 74 may be a reinforcement or the like that is already provided at the roof 15 in order to reinforce the roof panel 70, or may be ribs that are molded integrally with the roof head lining 72 (e.g., ribs that are formed in a lattice shape as seen in a vehicle plan view), or the like.

The reinforcing portion 74 is provided at the roof 15 at an interference region IR (shown in FIG. 1, and the reference numeral is omitted except in FIG. 1) that the above-described multidirectional airbag 30 interferes with in the process of inflating and expanding. This interference region IR is positioned at the upper side and obliquely front side with respect to the head portion H. Further, the reinforcing portion 74 is provided at the aforementioned interference region IR, i.e., only at a portion of the roof 15. Namely, at the roof 15, the structures of the region where the reinforcing portion 74 (the expanding direction regulating means) is provided and the other regions are different. Note that, in the present embodiment, there is a structure in which the front expanding portion 36 and the front ducts 35F, which are in the process of inflating and expanding, interfere with the interference region IR.

The dimension (the placement region) of the reinforcing portion 74 in the vehicle longitudinal direction is set such that the reinforcing portion 74 interferes with (abuts, via the roof head lining 72) the front expanding portion 36 that is in the process of inflating and expanding, regardless of the longitudinal slid position of the vehicle seat 12 with respect to the vehicle body.

The above-described reinforcing portion 74 reinforces the roof head lining 72 with respect to load from the lower side. Namely, at the roof 15, at the interference region IR at which the reinforcing portion 74 is provided, the rigidity with respect to load from the lower side is improved as compared with at regions that are adjacent to the interference region IR. Due thereto, there is a structure in which reaction force RF (see FIG. 2), which the multidirectional airbag 30 that interferes with the interference region IR receives from the interference region IR, is increased, and the expanding direction of the front expanding portion 36 is directed toward the front side of the head portion H (the arrow D direction in FIG. 2) by this reaction force RF.

In other words, in the present embodiment, the expanding direction of the multidirectional airbag 30 from the headrest 18 is set such that the multidirectional airbag 30 interferes with (abuts) the roof 15 in the process of inflating and expanding. In addition, due to the interference region IR, which the multidirectional airbag 30 interferes with, at the roof 15 being reinforced by the reinforcing portion 74, and the above-described reaction force RF being increased, the front expanding portion 36 is guided toward the front side of the head portion H.

(Operation and Effects)

Operation and effects of the present embodiment are described next.

In the vehicle occupant protecting device 10 of the above-described structure, when the ECU 60 senses or predicts a collision of the automobile 11 on the basis of signals from the collision predicting sensor 62 and the collision sensor 64, the inflator 32 is operated. Due thereto, gas generated from the inflator 32 is supplied into the left and right frame ducts 35 of the multidirectional airbag 30. As a result, the frame ducts 35 are inflated and expanded in the order of the rear ducts 35R, the upper ducts 35U and the front ducts 35F. The upper expanding portion 48, the lateral expanding portions 38 and the front expanding portion 36 expand successively toward the front side accompanying the frame ducts 35. Gas is supplied through the upper ducts 35U to the upper expanding portion 48, and the upper expanding portion 48 is inflated above the head portion H. Gas is supplied through the front ducts 35F to the lateral expanding portions 38 and the front expanding portion 36, and the lateral expanding portions 38 and the front expanding portion 36 inflate at the left and right both sides and the front side of the head portion H. Due thereto, the head portion H is protected from the front side, the left and right both sides, and the upper side.

Here, at the multidirectional airbag 30, the front expanding portion 36 that protects the head portion H from the front passes above the head portion H in the process of inflating and expanding. Further, in the process of inflating and expanding, the multidirectional airbag 30 interferes with the roof 15. The reinforcing portion 74 that serves as the expanding direction regulating means is provided at the roof 15 at the interference region IR that the multidirectional airbag 30 interferes with, and, due to the above-described interference, the expanding direction of the front expanding portion 36 is directed toward the front side of the head portion H.

Concretely, due to the above-described reinforcing portion 74, the interference region IR of the multidirectional airbag 30 at the roof 15 is reinforced with respect to load from the lower side. Therefore, at the time when the multidirectional airbag 30, which is in the process of inflating and expanding, interferes from the lower side with the interference region IR, deformation of the interference region IR is prevented or suppressed. As a result, the reaction force RF toward the lower side that the multidirectional airbag 30 receives from the interference region IR is high, and it is easy for the multidirectional airbag 30 to ricochet back toward the lower side. Due thereto, the front expanding portion 36 is guided toward the front side of the head portion H. As a result, the front expanding portion 36 can be expanded toward the front of the head portion H at an early stage.

Further, in the present embodiment, because there is a structure in which the roof 15 is partially reinforced by the reinforcing portion 74 that is disposed within the roof 15, it can be made such that the design of the roof 15 is not affected. Moreover, the reinforcing portion 74 is provided so as to interfere with the multidirectional airbag 30 that is in the process of inflating and expanding, regardless of the longitudinal slid position of the vehicle seat 12 with respect to the vehicle body. Accordingly, the effect of hastening the expanding of the front expanding portion 36 toward the front of the head portion is obtained regardless of the longitudinal slid position of the vehicle seat 12.

Moreover, in the present embodiment, the expanding direction of the multidirectional airbag 30 from the headrest 18 is set such that the multidirectional airbag 30 interferes with the roof 15 in the process of inflating and expanding. Due thereto, it can be made such that the multidirectional airbag 30 that is in the process of inflating and expanding does not interfere inadvertently with the head portion H.

Other embodiments of the present invention are described next. Note that structures and operations that are basically similar to those of the above-described first embodiment are denoted by the same reference numerals as in the above-described first embodiment, and description thereof is omitted.

Second Embodiment

Figure 6:
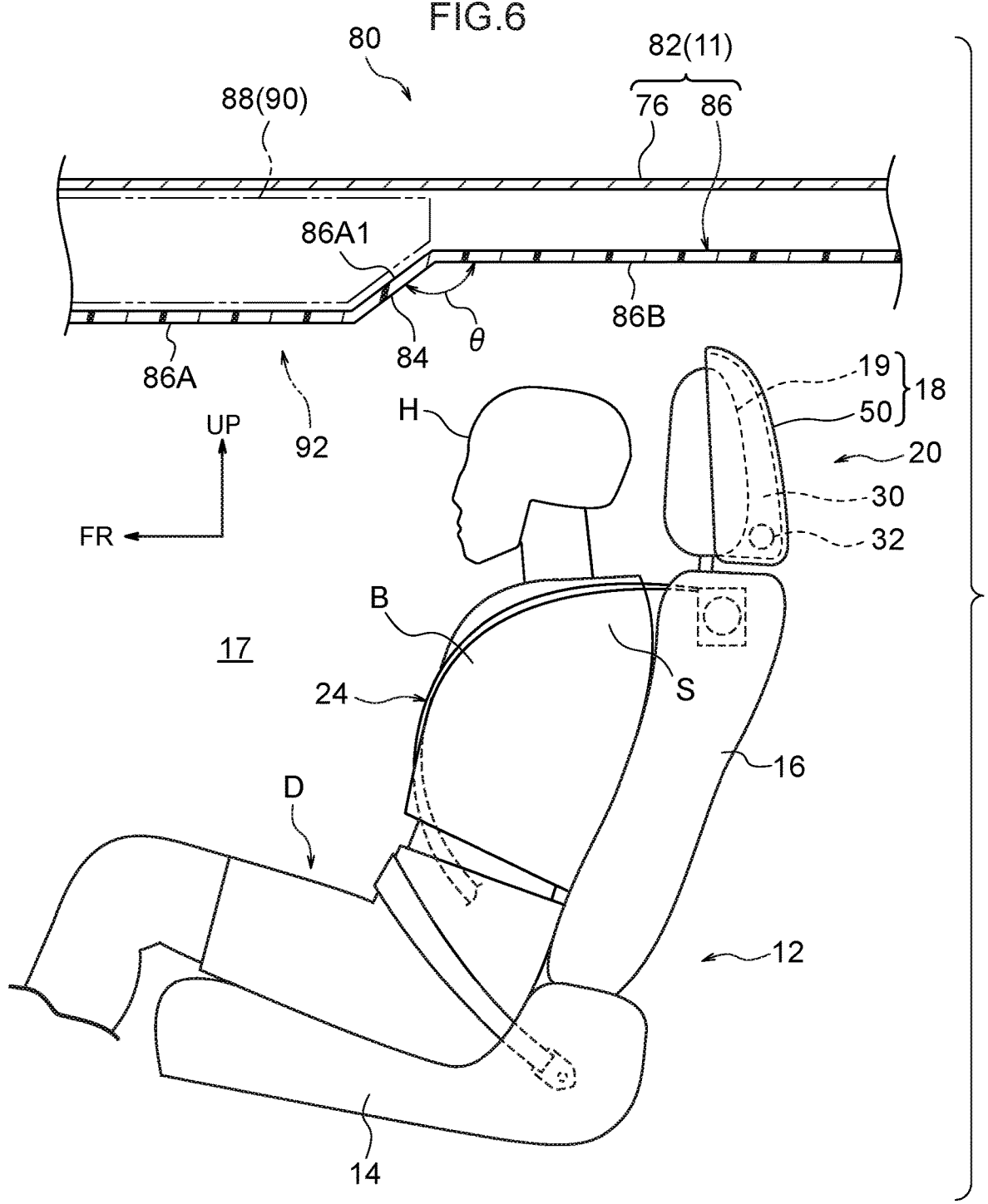
FIG. 6 is a cross-sectional view in which a partial structure of an automobile, to which a vehicle occupant protecting device relating to a second embodiment of the present invention is applied, is seen from the vehicle left side.
Figure 7:
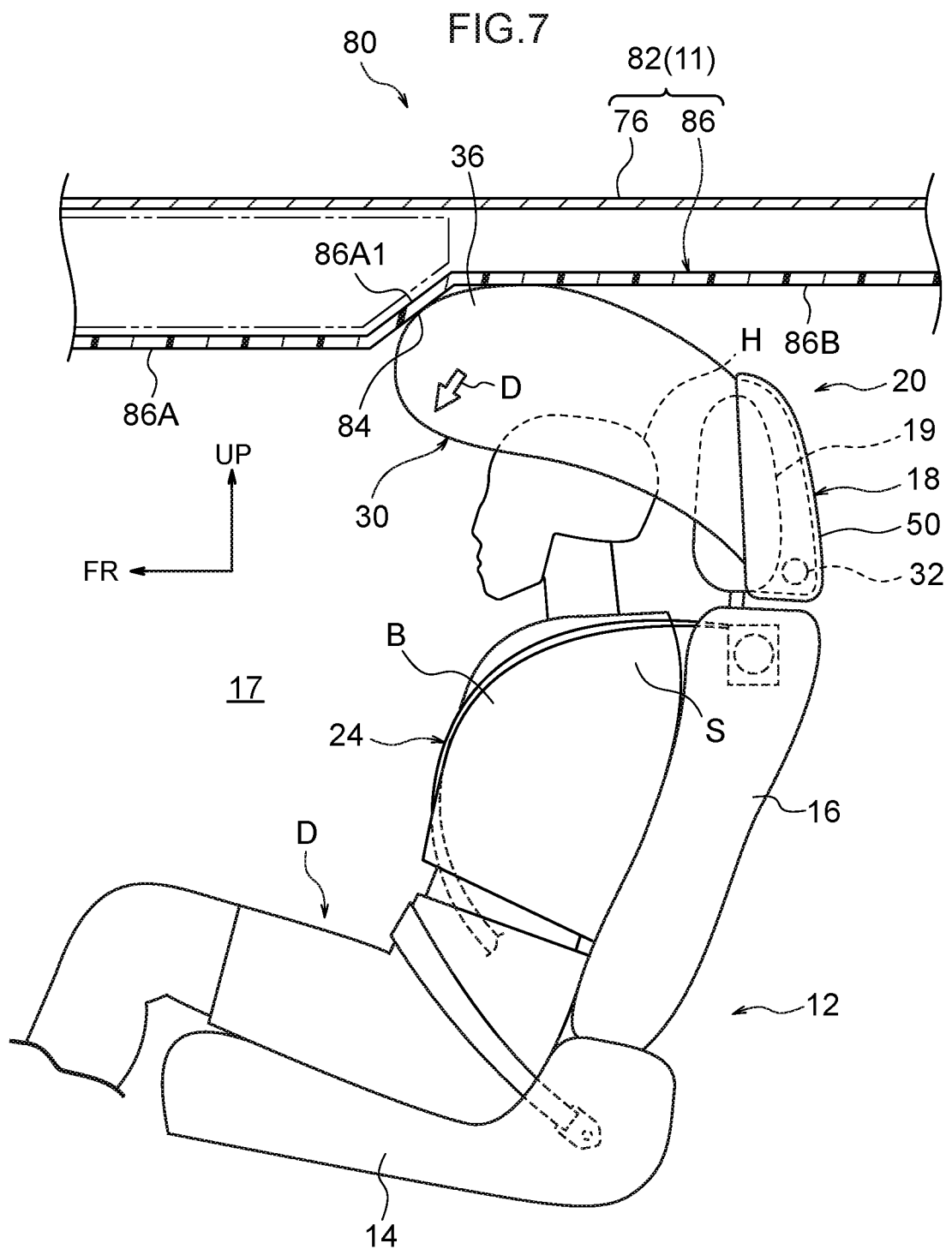
FIG. 7 is a cross-sectional view that corresponds to FIG. 6 and shows a state in the inflation and expansion process of an airbag in the vehicle occupant protecting device relating to the second embodiment.
Figure 8:
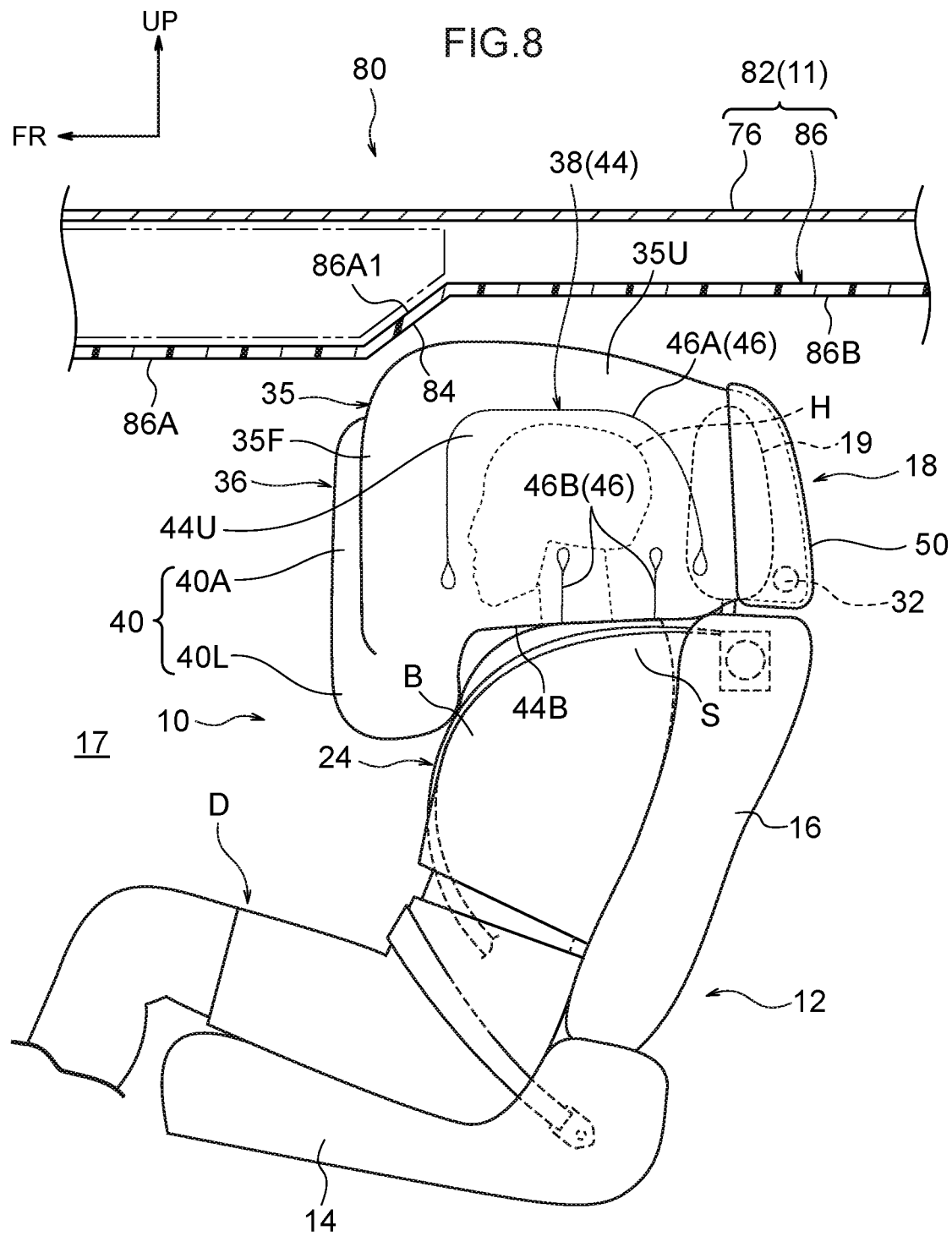
FIG. 8 is a cross-sectional view that corresponds to FIG. 6 and shows a state of completion of inflation and expansion of the airbag in the vehicle occupant protecting device relating to the second embodiment.

A partial structure of the automobile 11, to which a vehicle occupant protecting device 80 relating to a second embodiment of the present invention is applied, is shown in FIG. 6 in a cross-sectional view seen from the vehicle left side. Further, a state in the process of the inflation and expansion of the multidirectional airbag 30 at this vehicle occupant protecting device 80 is shown in FIG. 7 in a cross-sectional view that corresponds to FIG. 6. Moreover, a state of completion of inflation and expansion of the multidirectional airbag 30 in this vehicle occupant protecting device 80 is shown in FIG. 8 in a cross-sectional view that corresponds to FIG. 6.

In the vehicle occupant protecting device 80 relating to the second embodiment, the structure of a roof 82 that serves as a vehicle cabin ceiling differs from the roof 15 relating to the above-described first embodiment. Instead of the reinforcing portion 74 relating to the above-described first embodiment, an inclined surface 84 that serves as the expanding direction regulating means is provided at the roof 82. This inclined surface 84 is an expanding direction regulating surface (guiding surface) for directing the expanding direction of the front expanding portion 36 of the multidirectional airbag 30 toward the front side of the head portion H, and is formed at a roof head lining 86.

Concretely, at the roof head lining 86 relating to this embodiment, the region which is positioned further toward the vehicle front side than the head portion H of the vehicle occupant D is a bulging portion 86A that bulges-out toward the vehicle lower side, and, on the other hand, the region that is further toward the vehicle rear side than the bulging portion 86A is a non-bulging portion 86B that is positioned further toward the vehicle upper side than the bulging portion 86A. Further, the rear end portion of the bulging portion 86A is an inclined portion (step portion) 86A1 that is inclined downward while heading in the vehicle forward direction, and the lower surface of this inclined portion 86A1 is the aforementioned inclined surface 84. The inclined surface 84 is inclined so as to become lower while heading in the vehicle forward direction.

The above-described inclined surface 84 is provided at the roof head lining 86 at an interference region (the reference numeral of which is omitted in FIG. 6 through FIG. 8) that the multidirectional airbag 30 interferes with (abuts) in the process of inflating and expanding. Concretely, the inclined surface 84 is provided at the roof head lining 86 so as to be positioned at a vehicle obliquely front and upper side with respect to the head portion H of the vehicle occupant D. Angle θ that is formed by the inclined surface 84 and the lower surface of the non-bulging portion 86B is set to be greater than 90° and less than 180°. In this embodiment, structures other than those described above are similar to the above-described first embodiment.

In this embodiment, as shown in FIG. 7, the multidirectional airbag 30 that is in the process of inflating and expanding abuts (slidingly contacts) the above-described inclined surface 84. Due thereto, the expanding direction of the front expanding portion 36 is directed toward the front side of the head portion H (refer to arrow D in FIG. 7). Accordingly, in the same way as in the above-described first embodiment, the front expanding portion 36 can be made to expand toward the front of the head portion H at an early stage. Moreover, because the inclined surface 84 is inclined so as to become lower while heading toward the vehicle front side, the front expanding portion 36 can be effectively guided toward a vehicle obliquely front and lower side (toward the front side of the head portion H). Further, by changing the angle of the inclined surface 84 appropriately, the guided direction of the front expanding portion 36 can be adjusted easily.

Note that, in the above-described second embodiment, there may be a structure in which an air conditioner 88 or a sunroof device 90 (refer to the two-dot chain line in FIG. 6) is installed in the roof 82. Namely, at the roof 82 in which the air conditioner 88 or the sunroof device 90 is installed, there are cases in which an installation portion 92 for the air conditioner 88 or the sunroof device 90 is provided due to the bulging portion 86A such as that described above being formed at the roof head lining 86. In such a case, the end surface at the vehicle rear side of the installation portion 92 can be made to be the above-described inclined surface 84. Due thereto, the inclined surface 84 can be provided at the roof 82 by utilizing an existing structure. The aforementioned air conditioner 88 is disclosed in, for example, JP-A No. 2014-19270, and the aforementioned sunroof device 90 is disclosed in, for example, JP-A No. 2010-23693.

Figure 9:
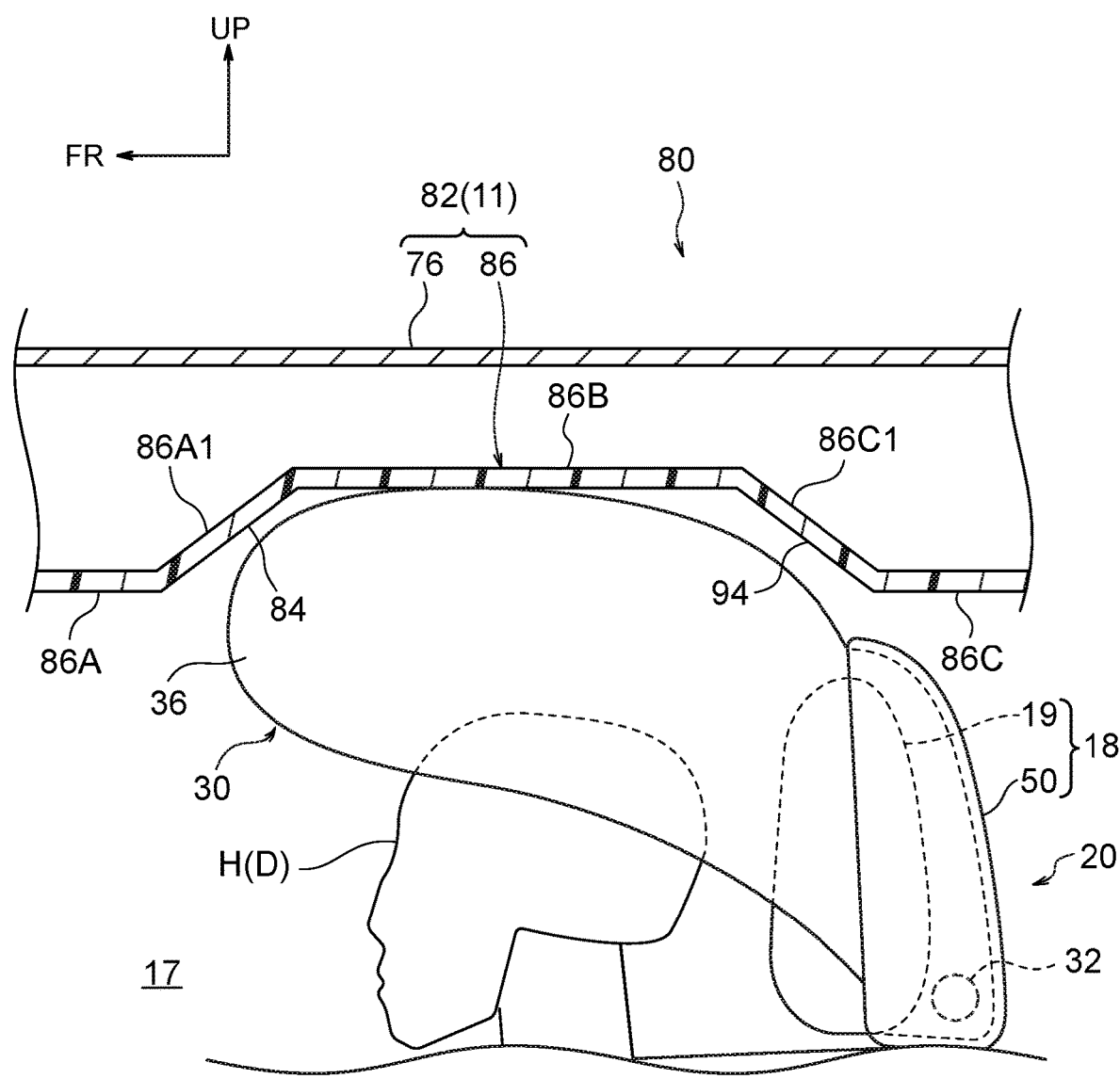
FIG. 9 is a cross-sectional view that corresponds to a portion of FIG. 7 and shows a modified example of the vehicle occupant protecting device relating to the second embodiment.

Further, in the above-described second embodiment, there may be a structure in which a rear side inclined surface 94 is provided at the roof 82 as in the modified example shown in FIG. 9. In this modified example, the region, which is positioned further toward the vehicle rear side than the head portion H of the vehicle occupant D, of the roof head lining 86 is a bulging portion 86C that bulges-out toward the vehicle lower side. Further, an inclined portion (step portion) 86C1, which is inclined downward while heading in the vehicle rearward direction, is formed at the front end portion of this bulging portion 86C. The lower surface of the inclined portion 86C1 is the aforementioned rear side inclined surface 94. The inclined surface 94 is inclined so as to become lower while heading in the vehicle rearward direction. In this modified example, a portion of the multidirectional airbag 30 inadvertently inflating and expanding toward the vehicle rear side can be prevented by the above-described inclined surface 94. Note that, in a case in which the vehicle seat 12 is disposed such that the seat front side is directed toward the vehicle rear, the above-described rear side inclined surface 94 can be made to be the "inclined surface (expanding direction regulating means)" relating to the present invention.

Third Embodiment

Figure 10:
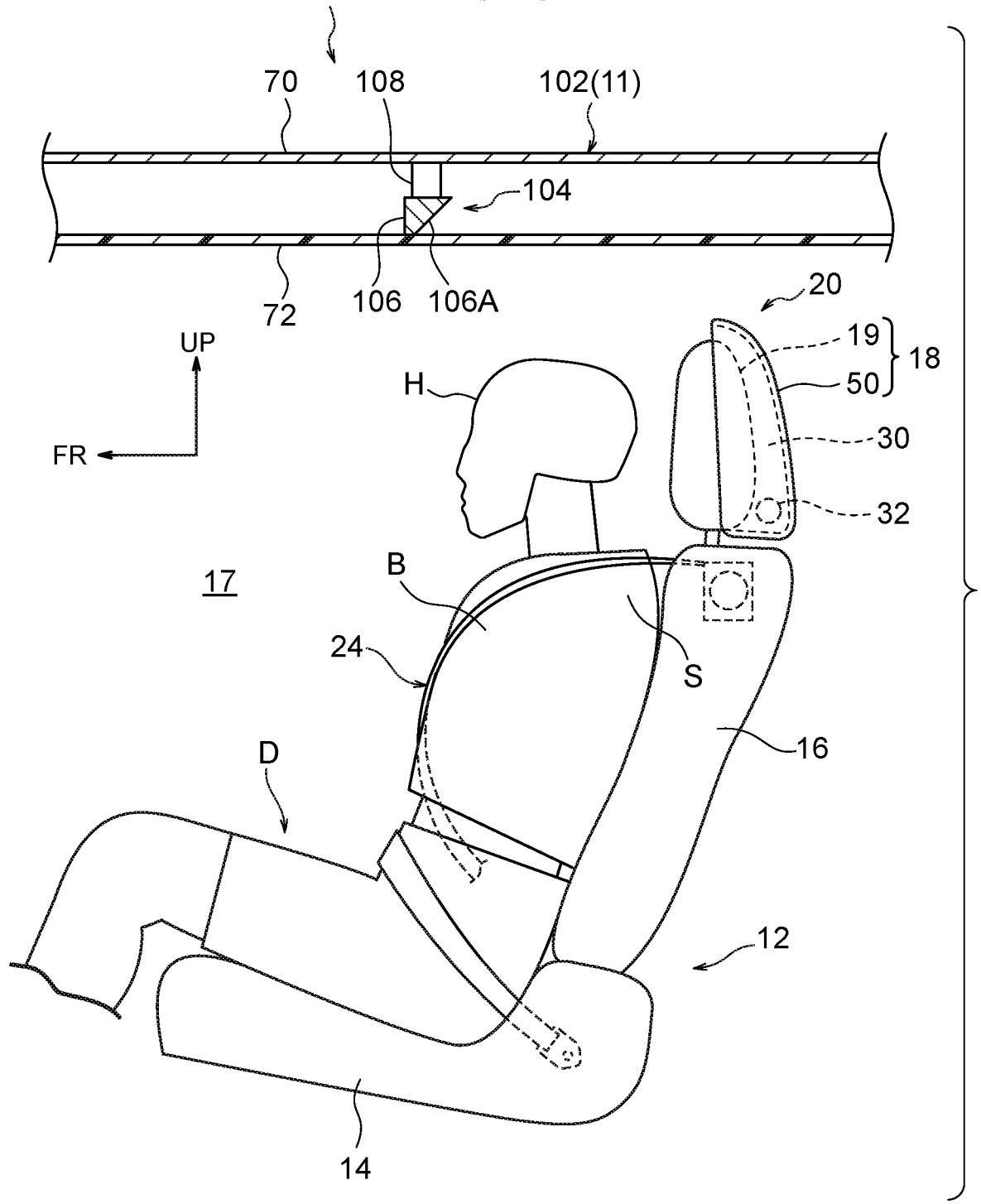
FIG. 10 is a cross-sectional view in which a partial structure of an automobile, to which a vehicle occupant protecting device relating to a third embodiment of the present invention is applied, is seen from the vehicle left side.
Figure 11:
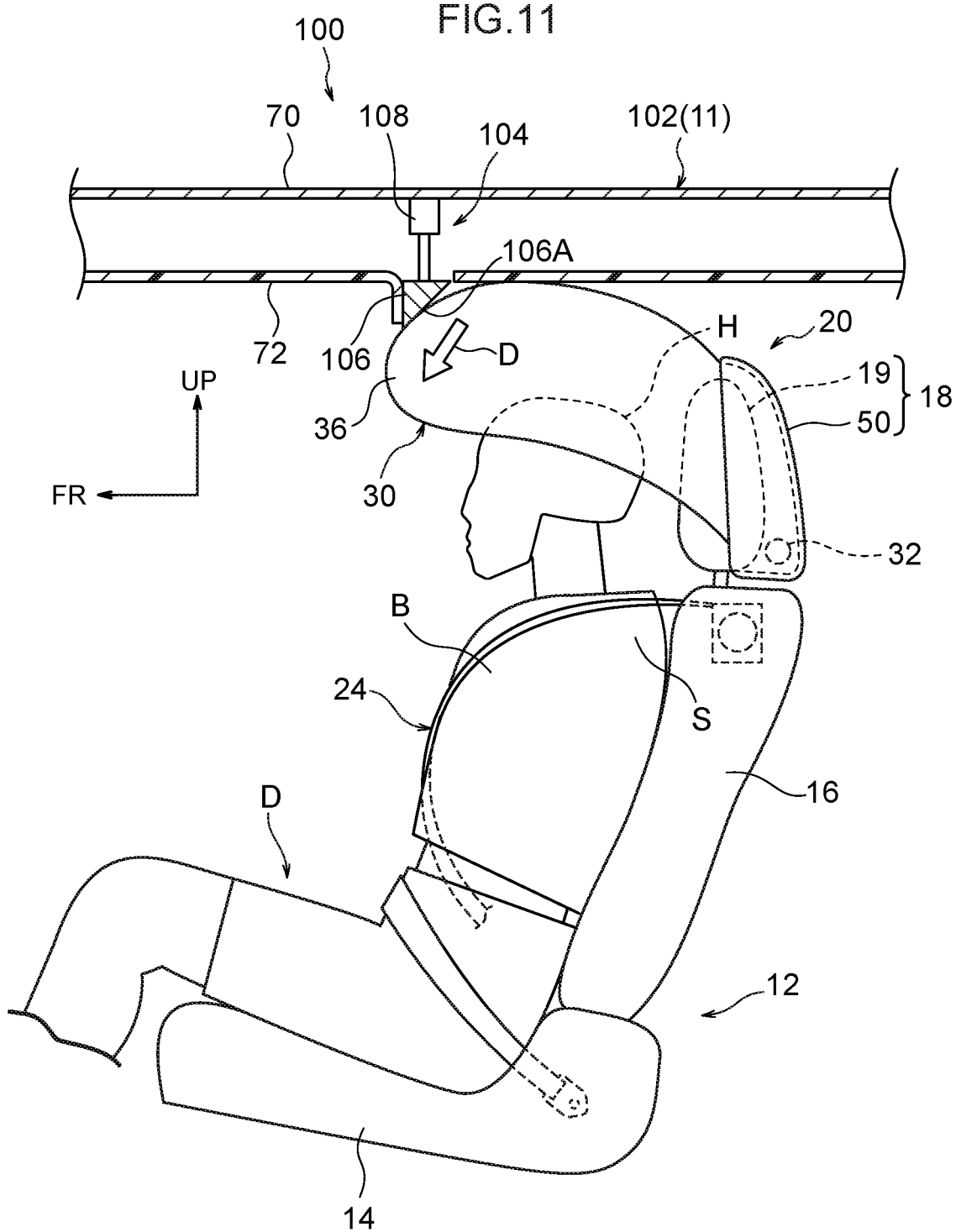
FIG. 11 is a cross-sectional view that corresponds to FIG. 10 and shows a state in the inflation and expansion process of an airbag in the vehicle occupant protecting device relating to the third embodiment.

The partial structure of the automobile 11, to which a vehicle occupant protecting device 100 relating to a third embodiment of the present invention is applied, is shown in FIG. 10 in a cross-sectional view seen from the vehicle left side. Further, a state in the process of the inflation and expansion of the multidirectional airbag 30 at this vehicle occupant protecting device 100 is shown in FIG. 11 in a cross-sectional view that corresponds to FIG. 10.

In the vehicle occupant protecting device 100 relating to the third embodiment, the structure of a roof 102 that serves as the vehicle cabin ceiling differs from the roof 15 relating to the above-described first embodiment. Instead of the reinforcing portion 74 relating to the above-described first embodiment, a driving mechanism 104 that structures the expanding direction regulating means is provided at the roof 102. The driving mechanism 104 is provided at the roof 102 at an interference region (the reference numeral of which is omitted in FIG. 10 through FIG. 11) that the multidirectional airbag 30 interferes with in the process of inflating and expanding. The driving mechanism 104 is structured by an interfering member 106 for interfering with the multidirectional airbag 30 that is in the process of inflating and expanding, and a drive source 108 that moves the interfering member 106 from the interior of the roof 102 toward the interior of the vehicle cabin 17.

The interfering member 106 here is formed in the shape of a block whose cross-section is substantially shaped as an upside-down triangle as seen from the vehicle transverse direction, and the surface thereof that is at the vehicle rear side is an inclined surface 106A that is inclined downward while heading toward the vehicle front side. At usual times, the interfering member 106 is disposed within the roof 102. The drive source 108 is an actuator that is structured to include a micro gas generator for example, and is disposed above the interfering member 106. The drive source 108 is fixed to the roof panel 70, and is structured so as to, by operating, move the interfering member 106 from the interior of the roof 102 toward the lower side of the roof 102.

Note that this is a structure in which, at the time of the above-described movement, a breakage portion that is provided at the roof head lining 72 is broken by the interfering member 106. Concretely, a substantially U-shaped groove (not illustrated), whose vehicle front side is open as seen in a vehicle plan view, is formed in the roof head lining 72 beneath the interfering member 106 that is positioned within the roof 102. Further, at the roof head lining 72, the region running along the aforementioned groove is a tear line portion (not illustrated) that is weak. This is a structure in which, due to the roof head lining 72 breaking at this tear line portion, an opening for the interfering member 106 to be inserted through is formed in the roof head lining 72 (see FIG. 11).

The aforementioned drive source 108 is electrically connected to the ECU 60 (refer to FIG. 1, not illustrated in FIG. 10 and FIG. 11) that is a control device. At the time when the ECU 60 outputs an operation signal to the inflator 32, the ECU 60 outputs an operation signal also to the drive source 108. Due thereto, there is a structure in which the drive source 108 operates inter-connectedly with the operation of the inflator 32. Note that there is no need for the timing at which the ECU 60 outputs the operation signal to the drive source 108, and the timing at which the ECU 60 outputs the operation signal to the inflator 32, to strictly be simultaneous. For example, there may be a structure in which the ECU 60 outputs the operation signal to the drive source 108 at a timing that is slightly earlier than the timing at which the ECU 60 outputs the operation signal to the inflator 32. In this embodiment, structures other than those described above are similar to the above-described first embodiment.

In this embodiment, the drive source 108 is operated at the time when the inflator 32 is operated, and the interfering member 106 is moved from the interior of the roof 102 toward the interior of the vehicle cabin 17 by the drive source 108. Due thereto, the multidirectional airbag 30 that is in the process of inflating expanding interferes with the inclined surface 106A of the interfering member 106, and the expanding direction of the front expanding portion 36 is directed toward the front side of the head portion H. Accordingly, in the same way as the above-described first embodiment, the front expanding portion 36 can be expanded toward the front of the head portion H at an early stage. Moreover, because the driving mechanism 104 has the drive source 108, at usual times, the interfering member 106 can be accommodated within the roof 102. Accordingly, the design of the roof 102 is not affected, and this is suitable.

Note that, in the above-described third embodiment, there is a structure in which the roof head lining 72 is broken at the tear line portion. However, the present disclosure is not limited to this, and there may be a structure in which a thin-walled portion that is formed at the roof head lining 72 is broken by the interfering member 106.

Fourth Embodiment

Figure 12:
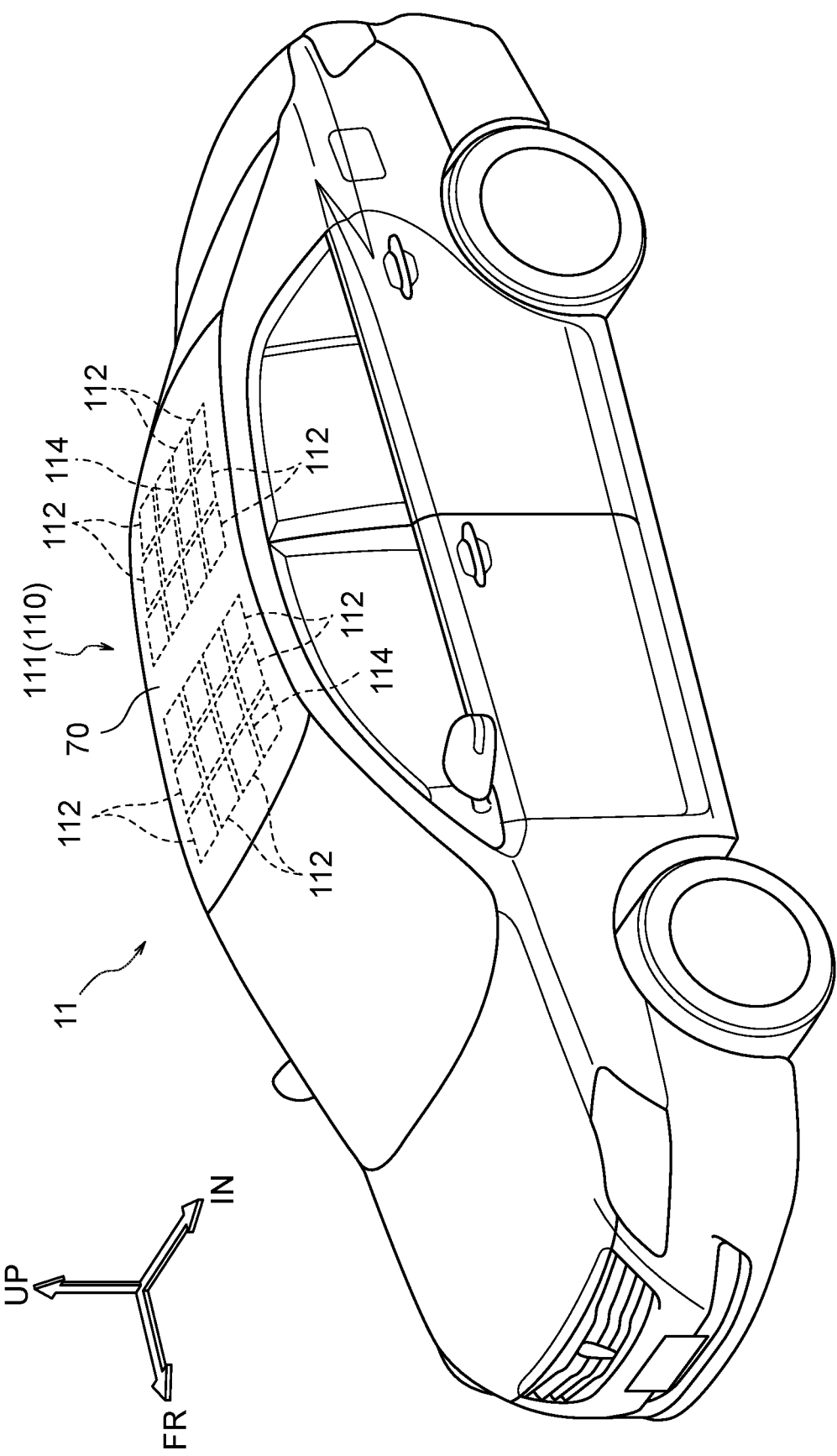
FIG. 12 is a perspective view of an automobile to which a vehicle occupant protecting device relating to a fourth embodiment of the present invention is applied.
Figure 13:
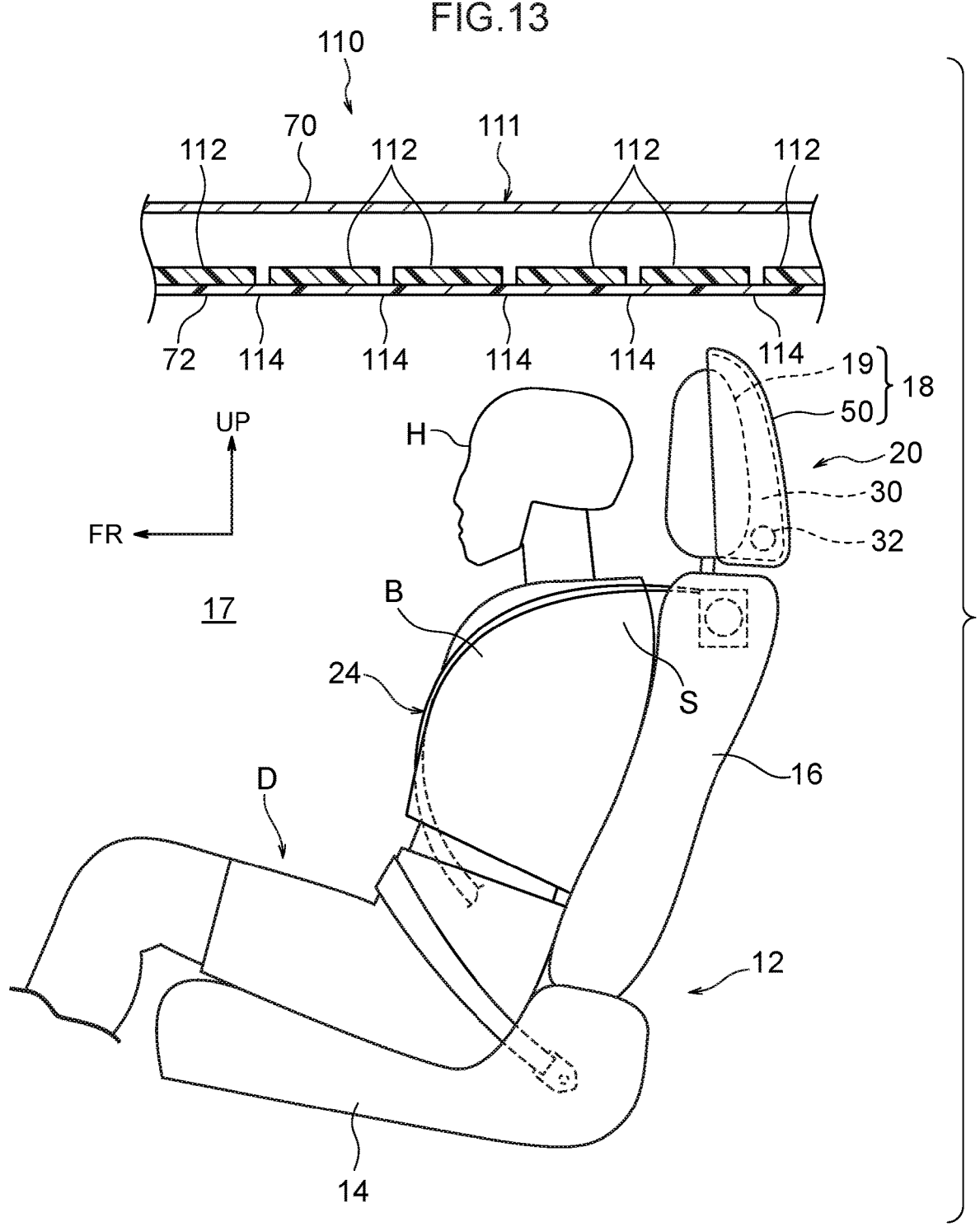
FIG. 13 is a cross-sectional view in which a partial structure of an automobile, to which the vehicle occupant protecting device relating to the fourth embodiment is applied, is seen from the vehicle left side.
Figure 14:
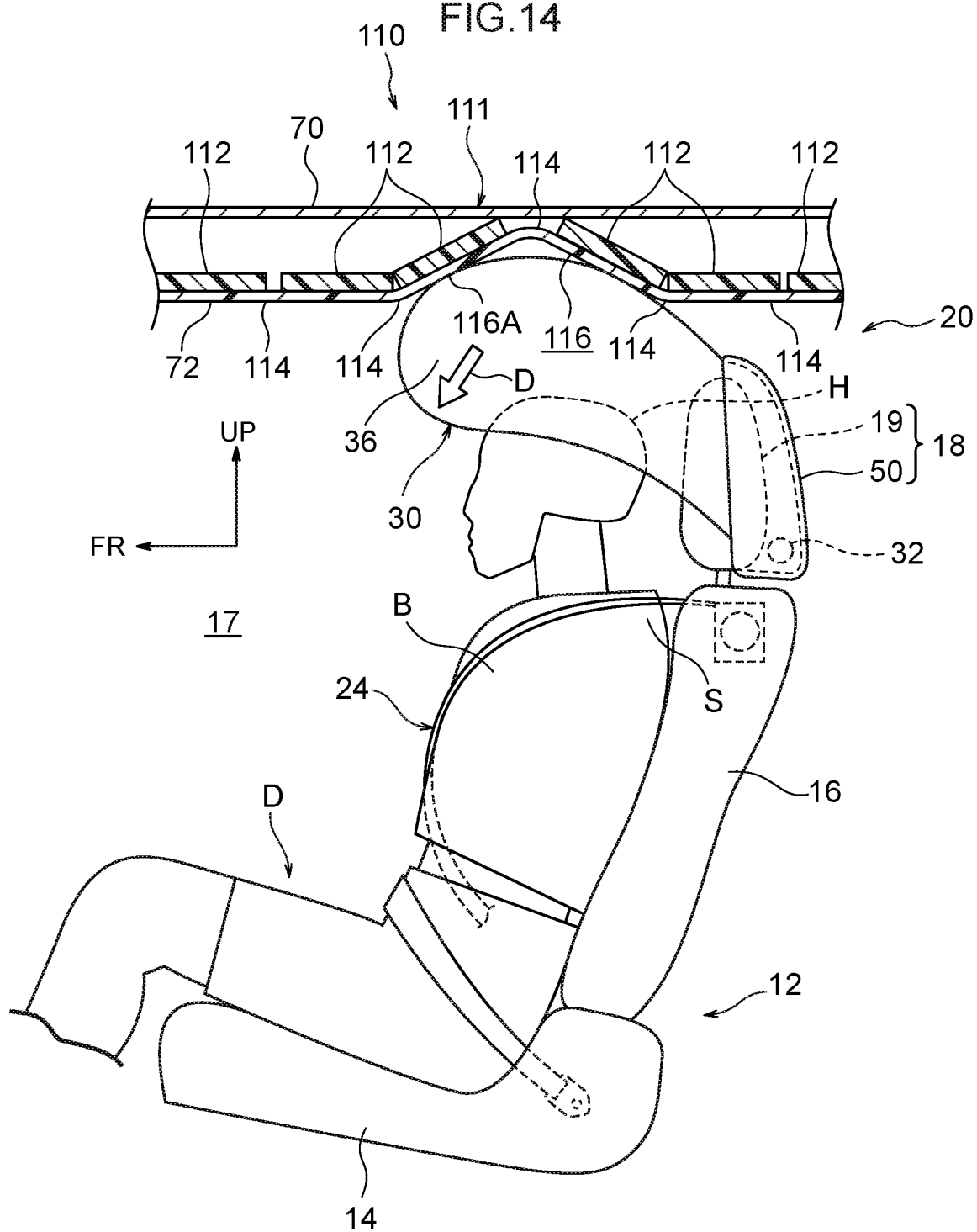
FIG. 14 is a cross-sectional view that corresponds to FIG. 13 and shows a state in the inflation and expansion process of an airbag in the vehicle occupant protecting device relating to the fourth embodiment.

The automobile 11, to which a vehicle occupant protecting device 110 relating to a fourth embodiment of the present invention is applied, is shown in FIG. 12 in a perspective view. Further, a partial structure of the automobile 11 relating to the fourth embodiment is shown in FIG. 13 in a cross-sectional view seen from the vehicle left side. Moreover, a state in the process of the inflation and expansion of the multidirectional airbag 30 at this vehicle occupant protecting device 110 is shown in FIG. 14 in a cross-sectional view that corresponds to FIG. 13.

In the vehicle occupant protecting device 110 relating to the fourth embodiment, the structure of a roof 111 that serves as a vehicle cabin ceiling differs from the roof 15 relating to the first embodiment. Instead of the reinforcing portion 74 relating to the first embodiment, plural plate-shaped members 112, which serve as plural reinforcing portions and structure the expanding direction regulating means, are provided at the roof 111. The plural plate-shaped members 112 are formed in the shapes of rectangular plates and of resin for example, and are fixed to the upper surface of the roof head lining 72 in a posture in which the plate thickness directions thereof run along the vehicle vertical direction. A gap (interval) is formed between the plural plate-shaped member 112 and the roof panel 70 as shown in FIG. 13. Note that the material of the plural plate-shaped members 112 is not limited to resin and can be changed appropriately, but a material that is light-weight and whose sound insulating ability and heat insulating ability are good is preferable.

As shown in FIG. 12, the plural plate-shaped members 112 are lined-up with slight intervals therebetween in the vehicle longitudinal direction and the vehicle transverse direction, and are disposed not only above the vehicle seat 12 that is the driver's seat, but also above the front passenger's seat and the rear seat that are not illustrated. Further, at the roof head lining 72, the places where the plural plate-shaped members 112 are fixed are reinforced by the plural plate-shaped members 112, and, on the other hand, the places where the plural plate-shaped members 112 are not fixed are weak portions 114 that are relatively weak. The weak portions 114 are formed in lattice shapes as seen in a vehicle plan view.

Note that the various methods such as adhesion, thermal welding, and the like can be used as the fixing direction of the plural plate-shaped members 112 with respect to the roof head lining 72. Further, the present disclosure is not limited to a structure in which the plural plate-shaped members (reinforcing portions) 112 are fixed to the roof head lining 72, and may be structured such that plural reinforcing portions (plate-shaped reinforcing portions) are molded integrally with the roof head lining 72.

Further, in this embodiment, the multidirectional airbag device 20 is installed not only in the headrest 18 of the vehicle seat 12 that is the driver's seat, but also in the headrest of the unillustrated front passenger's seat. Further, the multidirectional airbag devices 20 are installed also in a pair of left and right headrests that the unillustrated rear seat has. Moreover, in this embodiment, for example, the vehicle seat 12 and the unillustrated front passenger's seat are made able to rotate around axes that run along the vehicle vertical direction, and the orientations with respect to the vehicle body can be changed such that the seat front sides face the vehicle rear.

Further, the above-described plural plate-shaped members 112 are provided at the roof 11 at an interference region (the reference numeral of which is omitted in FIG. 13 through FIG. 15) that the multidirectional airbags 30 of the aforementioned respective multidirectional airbag devices 20 respectively interfere with in the process of inflating and expanding. Note that, in the following description, there are cases in which the vehicle seat 12 and the unillustrated front passenger's seat are called the vehicle seat 12 and the like.

In this embodiment, the multidirectional airbag 30 that is in the process of inflating and expanding interferes with (abuts) the roof head lining 72 that is the interior material of the roof 111. This roof head lining 72 is reinforced by the plural plate-shaped members 112 that are provided at the upper surface. These plural plate-shaped members 112 are lined-up in the vehicle longitudinal direction and the vehicle transverse direction. Therefore, at the time when the front expanding portion 36 contacts the roof head lining 72, the roof head lining 72 deforms at the weak portions 114 (non-reinforcing portions) that are between the plural plate-shaped members 112. Due thereto, the interfering portion (abutting portion), which interferes with (abuts) the multidirectional airbag 30, at the roof head lining 72 is indented toward the vehicle upper side, and a recess 116 is formed (see FIG. 14).

As a result, the place where the recess 116 is formed at the roof head lining 72 is curved or is bent so as to be convex toward the upper side as seen from the seat transverse direction. Because an inclined surface 116A that is inclined downward while heading toward the seat front side is formed at a portion of this recess 116, the expanding direction of the front expanding portion 36 can be directed toward the front side of the head portion H by this inclined surface 116A. Accordingly, in the same way as in the first embodiment, the front expanding portion 36 can be expanded toward the front of the head portion H at an early stage.

Moreover, due to the plate-shaped members 112, which are provided at the place where the recess 116 is formed, abutting the lower surface of the roof panel 70, the reaction force that is directed downward and that is applied to the front expanding portion 36 is high. Due thereto, the front expanding portion 36 can be guided effectively toward the front side of the head portion H. Further, due to the plural plate-shaped members 112 being fixed to the upper surface of the roof head lining 72, the sound insulating ability and the heat insulating ability of the vehicle cabin 17 can be improved.

Figure 15:
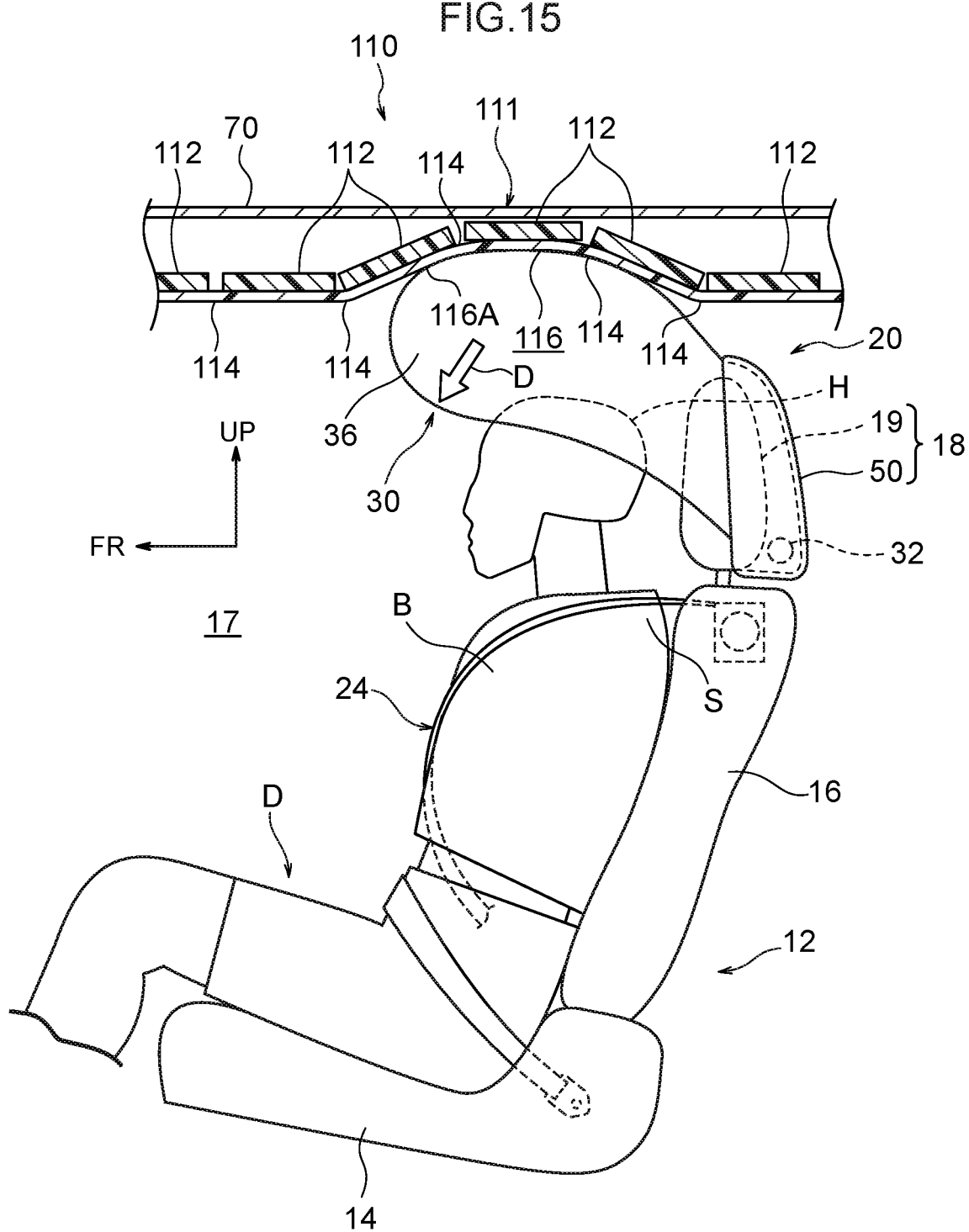
FIG. 15 is a cross-sectional view that corresponds to FIG. 13 and shows a state in the inflation and expansion process of the airbag in the vehicle occupant protecting device relating to the fourth embodiment, and is a drawing of a case in which the position of a vehicle seat with respect to a vehicle cabin ceiling is different than in FIG. 14.

Moreover, in this embodiment, even in a case in which the longitudinal slid positions of the vehicle seat 12 and the like with respect to the vehicle body of the automobile 11 are changed, or the orientations thereof with respect to the vehicle body are changed, the places where the above-described recesses 116 are formed change in accordance with the changes (variations) in the positions or the orientations. For example, as shown in FIG. 15, in a case in which the longitudinal slid position of the vehicle seat 12 is changed from the position shown in FIG. 14, the place where the recess 116 is formed changes in accordance with this change. Due thereto, the effect of hastening the expanding of the front expanding portion 36 toward the front of the head portion is obtained, regardless of the positions and orientations of the vehicle seat 12 and the like.

Supplementary Description of Embodiments

In the above-described fourth embodiment, there is a structure in which the plural plate-shaped members 112 are lined-up in the vehicle longitudinal direction and the vehicle transverse direction, but the present disclosure is not limited to this. Namely, there may be a structure in which the plural plate-shaped members 112 are lined-up only in the vehicle longitudinal direction, provided that it is not a structure that is displaced in the vehicle transverse direction accompanying the rotation of the vehicle seat 12 and the like around the vertical axes thereof, or the like.

Further, in the above-described fourth embodiment, there is a structure in which the vehicle seat 12 and the unillustrated passenger's seat are made able to rotate around the vertical axes thereof with respect to the vehicle body. However, the present disclosure is not limited to this. Namely, there may be a structure in which a rear seat of the vehicle (a seat in the second row or a row further rearward), in which the multidirectional airbag device 20 is installed, is made able to rotate around the vertical axis thereof.

Figure 16:
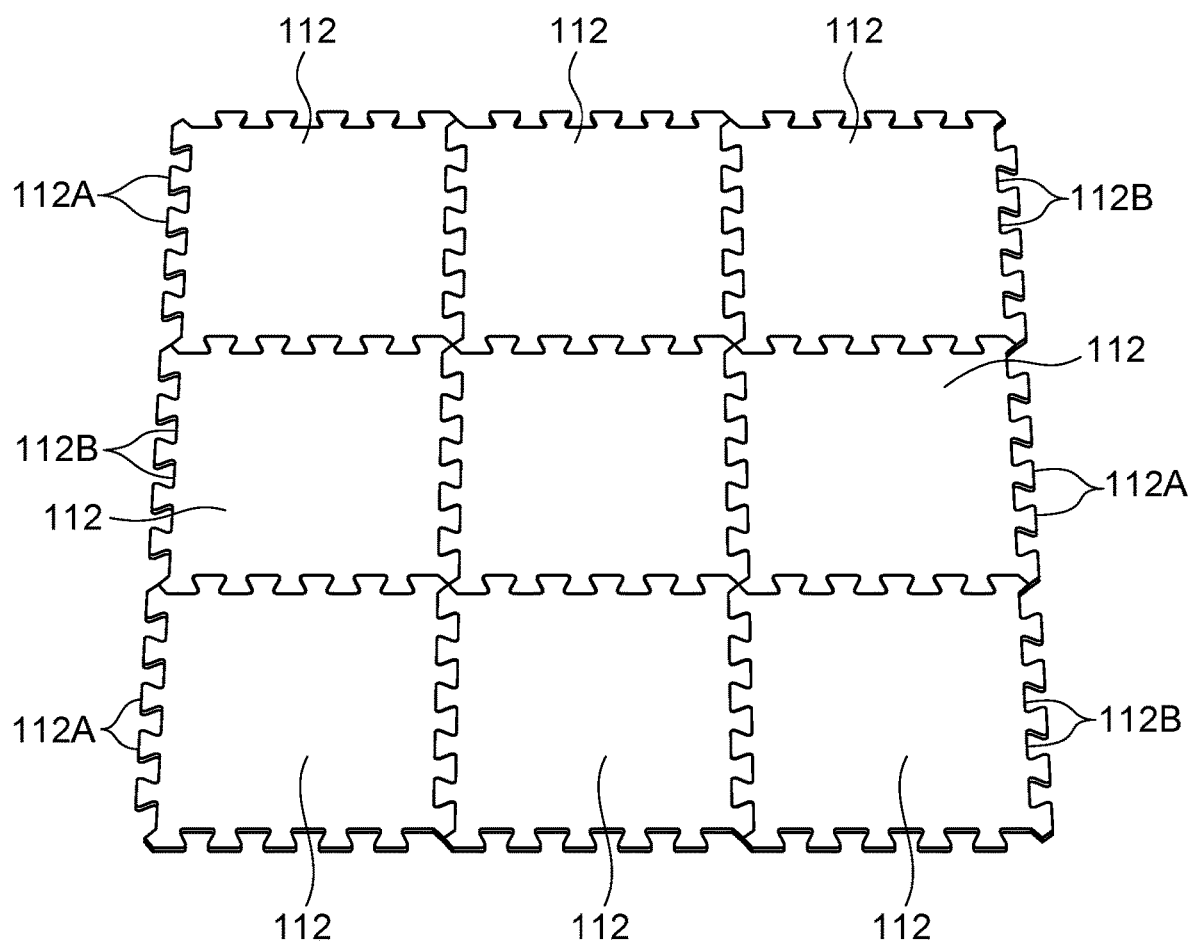
FIG. 16 is a perspective view showing a modified example of plural plate-shaped members that the vehicle occupant protecting device relating to the fourth embodiment has.

Further, in the above-described fourth embodiment, there is a structure in which the plural plate-shaped members 112 are lined-up in the vehicle longitudinal direction and the vehicle transverse direction with slight intervals therebetween. However, the present disclosure is not limited to this, and there may be a structure in which the plural plate-shaped members 112 are fit tightly to one another. For example, as in the modified example that is shown in FIG. 16, there may be a structure in which plural convex portions 112A and concave portions 112B that are substantially trapezoidal as seen in a vehicle plan view are formed at the end surfaces of the plural plate-shaped members 112, and these convex portions 12A and concave portions 112B are fit-together. Due thereto, it can be made such that gaps between the plural plate-shaped members 112 are eliminated, and the effect of improving the sound insulating ability and the heat insulating ability of the vehicle cabin 17 can be improved.

Further, in the above-described respective embodiments, there are structures in which the multidirectional airbag 30 has the pair of left and right frame ducts 35, the front expanding portion 36, the pair of left and right lateral expanding portions 38, and the upper expanding portion 48. However, the present disclosure is not limited to this, and the structure of the multidirectional airbag 30 can be changed appropriately. For example, there may be a structure in which the upper expanding portion 48 is omitted.

Further, in the above-described respective embodiments, there are structures in which the headrest 18 is connected to the upper end portion of the seatback 16. However, the present disclosure is not limited to this, and there may be a structure in which the headrest 18 is provided integrally with the upper end portion of the seatback 16. Further, in the above-described respective embodiments, there are structures in which the multidirectional airbag 30 is accommodated in the headrest 18 of the vehicle seat 12, but the present disclosure is not limited to this, and there may be a structure in which the multidirectional airbag is accommodated in the upper end portion of the seatback 16 of the vehicle seat 12.

Moreover, in the above-described respective embodiments, there are structures in which the reinforcing portion 74, the inclined surface 84, the driving mechanism 104 or the plural plate-shaped members 112 are made to be the expanding direction regulating means, but the present disclosure is not limited to this, and the structure of the expanding direction regulating means can be changed appropriately. Namely, it suffices for there to be a structure in which, in a case in which, at the vehicle cabin ceiling, the structures of the region where the expanding direction regulating means is provided and regions other than this (other regions) are different, and the airbag that is in the process of inflating and expanding interferes with the region where the expanding direction regulating means is provided, it is easier for the front expanding portion to be guided toward the front side of the head portion of the vehicle occupant, than in a case in which the airbag that is in the process of inflating and expanding interferes with the other regions.

In addition, the present invention can be embodied by being changed in various ways within a scope that does not depart from the gist thereof. Further, the scope of the right of the present invention is, of course, not limited to the above-described respective embodiments.

Note that the disclosure of Japanese Patent Application No. 2016-072603 that was filed on Mar. 31, 2016 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A vehicle occupant protecting device comprising:
an airbag that is accommodated in a headrest or a seatback, that receives a gas supply from an inflator and inflates and expands, that protects a head portion of a vehicle occupant from at least a front side and left and right both sides, and at which a front expanding portion, which protects the head portion from a front side, passes above the head portion in a process of inflating and expanding; and
a vehicle cabin ceiling at which an expanding direction regulating section is provided at an interference region which the airbag interferes with in the process of inflating and expanding, and that, by the interference, directs an expanding direction of the front expanding portion toward a front side of the head portion,
wherein the airbag is structured as an integral bag body, and
wherein the expanding direction regulating section comprises a reinforcing portion that is disposed within the vehicle cabin ceiling, that reinforces the interference region with respect to a load from a lower side, and that increases the reaction force which the airbag that interferes with the interference region receives from the interference region.

2. The vehicle occupant protecting device of claim 1, wherein the expanding direction regulating section has an inclined surface that is inclined downward while heading in a vehicle forward direction or a vehicle rearward direction, and the airbag that is in the process of inflating and expanding interferes with the inclined surface.

3. The vehicle occupant protecting device of claim 2, wherein, at the vehicle cabin ceiling, an installation portion in which an air conditioner or a sunroof device is installed, bulges out toward a lower side, and an end surface at a vehicle rear side of the installation portion is the inclined surface.

4. The vehicle occupant protecting device of claim 1, wherein the expanding direction regulating section has
an interfering member for interfering with the airbag that is in the process of inflating and expanding, and
a drive source that is operated at a time when the inflator is operated, and that moves the interfering member from an interior of the vehicle cabin ceiling toward an interior of a vehicle cabin.

5. The vehicle occupant protecting device of claim 1, wherein
the vehicle cabin ceiling has a roof head lining that is an interior material, and
the expanding direction regulating section is a plurality of reinforcing portions that are provided at an upper surface of the roof head lining so as to be lined up at least in a vehicle longitudinal direction among the vehicle longitudinal direction and a vehicle transverse direction, and that reinforce the roof head lining.

6. The vehicle occupant protecting device of claim 1, wherein
the airbag includes:
a pair of left and right frame ducts that inflate and expand with an interval therebetween at regions that include the left and right both sides and the upper side with respect to the head portion,
a front expanding portion that protects the head portion from the front,
a pair of lateral expanding portions that protect the head portion from the left and right both sides, and
an upper expanding portion that protects the head portion from the upper side; and
the pair of left and right frame ducts are configured to guide gas from the inflator to the front expanding portion, the pair of lateral expanding portions, and the upper expanding portion.

* * * * *